United States Patent
Matsumura et al.

(10) Patent No.: US 10,457,137 B2
(45) Date of Patent: Oct. 29, 2019

(54) SYSTEM FOR CONTROLLING OPENING/CLOSING OF SHUTTER FOR VEHICLE

(71) Applicant: HONDA MOTOR CO., LTD., Minato-Ku, Tokyo (JP)

(72) Inventors: Shunpei Matsumura, Wako (JP); Hideki Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 15/549,768

(22) PCT Filed: Feb. 13, 2015

(86) PCT No.: PCT/JP2015/053938
§ 371 (c)(1),
(2) Date: Aug. 9, 2017

(87) PCT Pub. No.: WO2016/129096
PCT Pub. Date: Aug. 18, 2016

(65) Prior Publication Data
US 2018/0022210 A1  Jan. 25, 2018

(51) Int. Cl.
*B60K 11/08* (2006.01)
*B60K 11/04* (2006.01)
(Continued)

(52) U.S. Cl.
CPC ........ *B60K 11/085* (2013.01); *B60H 1/00671* (2013.01); *B60H 1/00771* (2013.01); *B60H 1/00807* (2013.01)

(58) Field of Classification Search
CPC .......... B60K 11/085; B60K 11/04; F01P 7/12; B60H 1/00807; B60H 1/00771; B60H 1/00671; Y02T 10/88
See application file for complete search history.

(56) References Cited

U.S. PATENT DOCUMENTS

2006/0254838 A1   11/2006   Ino et al.
2007/0119395 A1   5/2007   Nagano et al.
(Continued)

FOREIGN PATENT DOCUMENTS

CN   1853971 A   11/2006
CN   1974255 A   6/2007
(Continued)

OTHER PUBLICATIONS

Office Action dated Nov. 19, 2018 issued in the corresponding Chinese Patent Application No. 201580076057.2 with the English translation thereof.

*Primary Examiner* — Jacob M Amick
*Assistant Examiner* — Charles Brauch
(74) *Attorney, Agent, or Firm* — Carrier Blackman & Associates, P.C.; Joseph P. Carrier; Jeffrey T. Gedeon

(57) ABSTRACT

Provided is a system for controlling opening/closing of a shutter for a vehicle, which allows the shutter to be appropriately opened and closed on the whole travel path of the vehicle. A control device for the shutter includes: an opening/closing control unit that brings the shutter into an open state when a temperature in an engine room exceeds a predetermined threshold, and brings the shutter into a closed state when the temperature is the threshold or less; and a traveling state predicting unit that predicts a traveling state of the vehicle after a lapse of a predetermined time based on map information and path information. The opening/closing control unit has a threshold changing section that changes the threshold based on the traveling state of the vehicle after the lapse of the predetermined time predicted by the traveling state predicting unit.

11 Claims, 18 Drawing Sheets

(51) Int. Cl.
*B60H 1/00* (2006.01)
*F01P 7/12* (2006.01)

(56) References Cited

U.S. PATENT DOCUMENTS

| | | | |
|---|---|---|---|
| 2010/0323686 A1* | 12/2010 | Noda | H04W 24/08 |
| | | | 455/423 |
| 2011/0204149 A1* | 8/2011 | Prior | B60K 11/085 |
| | | | 236/35.2 |
| 2012/0222438 A1 | 9/2012 | Osaka et al. | |
| 2013/0110356 A1 | 5/2013 | Konishi et al. | |
| 2013/0197795 A1* | 8/2013 | Basnayake | G01C 21/30 |
| | | | 701/412 |
| 2014/0116247 A1* | 5/2014 | Nakazato | F02D 41/0245 |
| | | | 95/20 |

FOREIGN PATENT DOCUMENTS

| | | | | |
|---|---|---|---|---|
| JP | 2005-094928 A | | 4/2005 | |
| JP | 2005-287149 A | | 10/2005 | |
| JP | 2005287149 A | * | 10/2005 | |
| JP | 2007-145274 A | | 6/2007 | |
| JP | 2007-320527 A | | 12/2007 | |
| JP | 2011-111140 A | | 6/2011 | |
| JP | 2011111140 A | * | 6/2011 | ......... B60H 1/00271 |
| JP | 2013-018361 A | | 1/2013 | |
| WO | 2012-005077 A1 | | 1/2012 | |

\* cited by examiner

SYSTEM FOR CONTROLLING OPENING/CLOSING OF SHUTTER FOR VEHICLE

TECHNICAL FIELD

The present invention relates to a system for controlling opening/closing of a shutter for a vehicle.

BACKGROUND ART

There is known a shutter that is provided at a front part of a vehicle and capable of being opened and closed. The shutter is opened to allow outside air to be introduced into an engine room, thereby cooling machinery such as an engine.

For example, Patent Literature 1 discloses a technique of performing opening/closing of the shutter based on outside air temperature, vehicle speed, cooling load for radiator-condenser, and the like.

CITATION LIST

Patent Literature

Patent Literature 1: Japanese Unexamined Patent Application Publication No. 2007-320527

SUMMARY OF THE INVENTION

Technical Problem

In the technique disclosed in Patent Literature 1, the shutter is adapted to be opened and closed based on outside air temperature and the like at every moment (i.e., at the present time) while the vehicle is traveling. Accordingly, when the vehicle is traveling, for example, on a path in which ups and downs are repeated, or on a path in which curves are repeated, the shutter is frequently opened and closed in accordance with the vehicle speed and/or load condition of the engine. As a result, there is a possibility that much electric power is wastefully consumed by opening/closing of the shutter, and behavior of the vehicle becomes unstable due to fluctuation in air resistance.

Moreover, in the technique disclosed in Patent Literature 1, for example, there is a possibility that, although the vehicle has moved to the vicinity of a destination which is a scheduled stop point, the shutter is opened on the way depending on circumstances. As a result, problems occur in that air resistance is increased, and fuel consumption becomes worse because a large amount of electric power is required for warming-up at the next start-up due to wasteful cooling of the engine.

Thus, in the technique disclosed in Patent Literature 1, there is a case where the shutter is not appropriately opened or closed on the whole travel path of the vehicle.

It is therefore an object of the present invention to provide a system for controlling opening/closing of a shutter for a vehicle, which allows the shutter to be appropriately opened and closed on the whole travel path of the vehicle.

Solution to Problem

In order to solve the above problems, the present invention provides a system for controlling opening/closing of a shutter for a vehicle, the shutter being disposed at an opening section through which outside air is introduced into a driving source housing chamber that houses a driving source of the vehicle, the system including: a temperature detecting unit that detects a temperature in the driving source housing chamber or a temperature of the driving source; an opening/closing control unit that brings the shutter into an open state when the temperature detected by the temperature detecting unit exceeds a predetermined threshold, and brings the shutter into a closed state when the temperature is equal to or lower than the threshold; and a traveling state predicting unit that includes a map information acquiring section that acquires map information related to a map around the vehicle, and a path information acquiring section that acquires path information related to paths on which the vehicle travels, and predicts a traveling state of the vehicle after a lapse of a predetermined time based on the map information acquired by the map information acquiring section and the path information acquired by the path information acquiring section, the opening/closing control unit including a threshold changing section that changes the threshold based on the traveling state of the vehicle after the lapse of the predetermined time predicted by the traveling state predicting unit.

According to the system thus configured, the opening/closing control unit includes the threshold changing section that changes the temperature threshold which is a criterion used in opening/closing of the shutter, based on the traveling state of the vehicle after the lapse of the predetermined time predicted by the traveling state predicting unit. Therefore, the shutter can be appropriately opened and closed on the whole travel path of the vehicle, thus making it possible to cool the driving source and the like housed in the driving source housing chamber by outside air, and to enhance fuel consumption and traveling stability of the vehicle.

Moreover, the above system is preferably configured so that the traveling state predicting unit includes a time changing section that changes the predetermined time based on the map information acquired by the map information acquiring section and the path information acquired by the path information acquiring section.

According to the system thus configured, the time changing section changes the "predetermined time" which is used in prediction of the traveling state, based on the map information and the path information. Therefore, the shutter can be appropriately opened and closed on the whole travel path of the vehicle by suitably changing the "predetermined time", for example, based on whether or not the traveling state of the vehicle frequently changes in the future.

Moreover, the above system is preferably configured so that the traveling state predicting unit includes a prediction period changing section that changes a period with which the traveling state of the vehicle is predicted, based on the map information acquired by the map information acquiring section and the path information acquired by the path information acquiring section.

According to the system thus configured, the prediction period changing section changes the period with which the traveling state is predicted, based on the map information and the path information. Therefore, opening/closing of the shutter can be performed at an appropriate frequency by suitably changing the prediction period, for example, based on whether or not the traveling state of the vehicle frequently changes in the future.

Moreover, the above system is preferably configured so that the traveling state predicting unit includes: a vehicle speed detecting section that detects a vehicle speed which is a speed of the vehicle; and a traveling state change predicting section that predicts a timing at which the traveling state of the vehicle changes, based on the vehicle speed detected by the vehicle speed detecting section, the map information acquired by the map information acquiring section and the path information acquired by the path information acquiring section, and the threshold changing section changes the threshold prior to the timing predicted by the traveling state change predicting section.

According to the system thus configured, the threshold changing section changes the threshold which is a criterion used in opening/closing of the shutter, prior to the predicted timing at which the traveling state of the vehicle changes. This makes it possible to complete the opening/closing operation of the shutter before the traveling state of the vehicle changes. That is, the opening/closing operation of the shutter can be prevented from being performed when the traveling state of the vehicle is changing, and thus a change in behavior of the vehicle can be suppressed.

Moreover, the above system is preferably configured so that the traveling state predicting unit includes a gradient information acquiring section that acquires gradient information related to gradients of paths on which the vehicle travels, based on the path information acquired by the path information acquiring section, and the threshold changing section lowers the threshold when it is predicted that the vehicle travels on an up-grade after the lapse of the predetermined time, based on the gradient information acquired by the gradient information acquiring section.

According to the system thus configured, when it is predicted that the vehicle travels on an up-grade, based on the gradient information acquired by the gradient information acquiring section, the threshold changing section lowers the threshold which is a criterion used in opening/closing of the shutter. This allows the shutter to be easily opened, thus making it possible to cool the driving source and the like by traveling wind flowing into the driving source housing chamber while traveling on the up-grade.

Moreover, the above system is preferably configured so that the traveling state predicting unit includes a gradient information acquiring section that acquires gradient information related to gradients of paths on which the vehicle travels, based on the path information acquired by the path information acquiring section, and the threshold changing section raises the threshold when it is predicted that the vehicle travels on a down-grade after the lapse of the predetermined time, based on the gradient information acquired by the gradient information acquiring section.

According to the system thus configured, when it is predicted that the vehicle travels on a down-grade, based on the gradient information acquired by the gradient information acquiring section, the threshold changing section raises the threshold which is a criterion used in opening/closing of the shutter. This allows the shutter to be easily closed, thus making it possible to generate down-force by air flowing on the upper side of the vehicle, thereby suppressing a change in behavior of the vehicle.

Moreover, the above system is preferably configured so that the traveling state predicting unit includes a grip force change predicting section that predicts presence or absence of a change in grip force of the vehicle after the lapse of the predetermined time from the present time as a reference, based on the path information acquired by the path information acquiring section, and when the grip force change predicting section predicts that there is a change in the grip force of the vehicle, and the shutter is in the closed state at the present time, the threshold changing section raises the threshold, and when the grip force change predicting section predicts that there is a change in the grip force of the vehicle, and the shutter is in the open state at the present time, the threshold changing section lowers the threshold.

According to the system thus configured, when the grip force change predicting section predicts that "there is a change" in the grip force of the vehicle just before the vehicle comes near to a curve or the like, the threshold changing section changes the threshold so as to allow the open/closed state of the shutter at the present time to be easily maintained. This makes it possible to prevent a change in the grip force due to the traveling state of the vehicle and a change in the grip force due to the opening/closing of the shutter from being caused concurrently with respect to time, and thus to suppress a change in behavior of the vehicle.

Moreover, the above system is preferably configured so that the traveling state predicting unit includes a grip force change predicting section that predicts presence or absence of a change in grip force of the vehicle after the lapse of the predetermined time from the present time as a reference, based on the path information acquired by the path information acquiring section, and the opening/closing control unit includes an opening/closing speed changing section that changes an opening/closing speed of the shutter, wherein when the grip force change predicting section predicts that there is a change in the grip force of the vehicle, the opening/closing speed changing section makes the opening/closing speed of the shutter slower than when it is predicted that there is no change in the grip force of the vehicle.

According to the system thus configured, when the grip force change predicting section predicts that "there is a change" in the grip force of the vehicle, the opening/closing speed changing section makes the opening/closing speed of the shutter slower. This allows the opening/closing speed of the shutter to be made slower, for example, even where the temperature in the driving source housing chamber or the like exceeds the threshold when the vehicle comes near to a curve, thereby making it possible to suppress a change in behavior of the vehicle while traveling on the curve.

Moreover, the above system is preferably configured so that the traveling state predicting unit includes a remaining travel distance predicting section that predicts a remaining travel distance needed until the vehicle stops, based on the path information acquired by the path information acquiring section, and the threshold changing section raises the threshold when the remaining travel distance predicted by the remaining travel distance predicting section is shorter than a predetermined distance.

According to the system thus configured, when the remaining travel distance predicted by the remaining travel distance predicting section is shorter than a predetermined distance, the threshold changing section raises the threshold which is a criterion used in opening/closing of the shutter. Also, since the temperature of the driving source never rises after the vehicle arrives at a destination, the above threshold is raised to bring the shutter into a state of being easily closed, thereby making it possible to decrease air resistance of the vehicle and to generate down-force. Therefore, fuel consumption of the vehicle can be enhanced and a change in behavior of the vehicle can be suppressed.

Moreover, the above system is preferably configured so that the traveling state predicting unit includes a remaining travel distance predicting section that predicts a remaining travel distance needed until the vehicle stops, based on the path information acquired by the path information acquiring section, and the threshold changing section gradually raises the threshold as the remaining travel distance predicted by the remaining travel distance predicting section becomes shorter.

According to the system thus configured, the threshold changing section gradually raises the threshold, which is a criterion used in opening/closing of the shutter, as the remaining travel distance predicted by the remaining travel distance predicting section becomes shorter. That is, the shutter is brought into a state of being easily closed as the vehicle comes nearer a predicted stop point, thereby making it possible to enhance fuel consumption and traveling stability of the vehicle.

Moreover, the above system is preferably configured so that the traveling state predicting unit includes a traffic jam information acquiring section that acquires traffic jam information related to paths on which the vehicle travels, based on the path information acquired by the path information acquiring section, and the threshold changing section raises the threshold when it is predicted that the vehicle arrives at a traffic jam point, based on the traffic jam information acquired by the traffic jam information acquiring section.

According to the system thus configured, when it is predicted that the vehicle arrives at a traffic jam point, based on the traffic jam information acquired by the traffic jam information acquiring section, the threshold changing section raises the threshold which is a criterion used in opening/closing of the shutter. That is, the shutter is brought into a state of being easily closed until the vehicle arrives at the traffic jam point, thereby making it possible to give priority to aerodynamic performance rather than cooling of machinery such as the driving source and thus to enhance fuel consumption of the vehicle.

Moreover, the above system is preferably configured so that the traveling state predicting unit includes a road type information acquiring section that acquires road type information related to road types of paths on which the vehicle travels, based on the path information acquired by the path information acquiring section, and the threshold changing section lowers the threshold when it is predicted that the vehicle transfers from a general road to an expressway, based on the road type information acquired by the road type information acquiring section.

According to the system thus configured, when it is predicted that the vehicle transfers from a general road to an expressway, based on the road type information acquired by the road type information acquiring section, the threshold changing section lowers the threshold which is a criterion used in opening/closing of the shutter. That is, the shutter is brought into a state of being easily opened until the vehicle transfers to the expressway, thereby making it possible to allow traveling wind to flow into the driving source housing chamber and thus to cool the driving source and the like.

Advantageous Effects of the Invention

The present invention makes it possible to provide a system for controlling opening/closing of a shutter for a vehicle, which allows the shutter to be appropriately opened and closed on the whole travel path of the vehicle.

DESCRIPTION OF EMBODIMENTS

First Embodiment

⟨Configuration Related to a Shutter⟩

Figure 1:
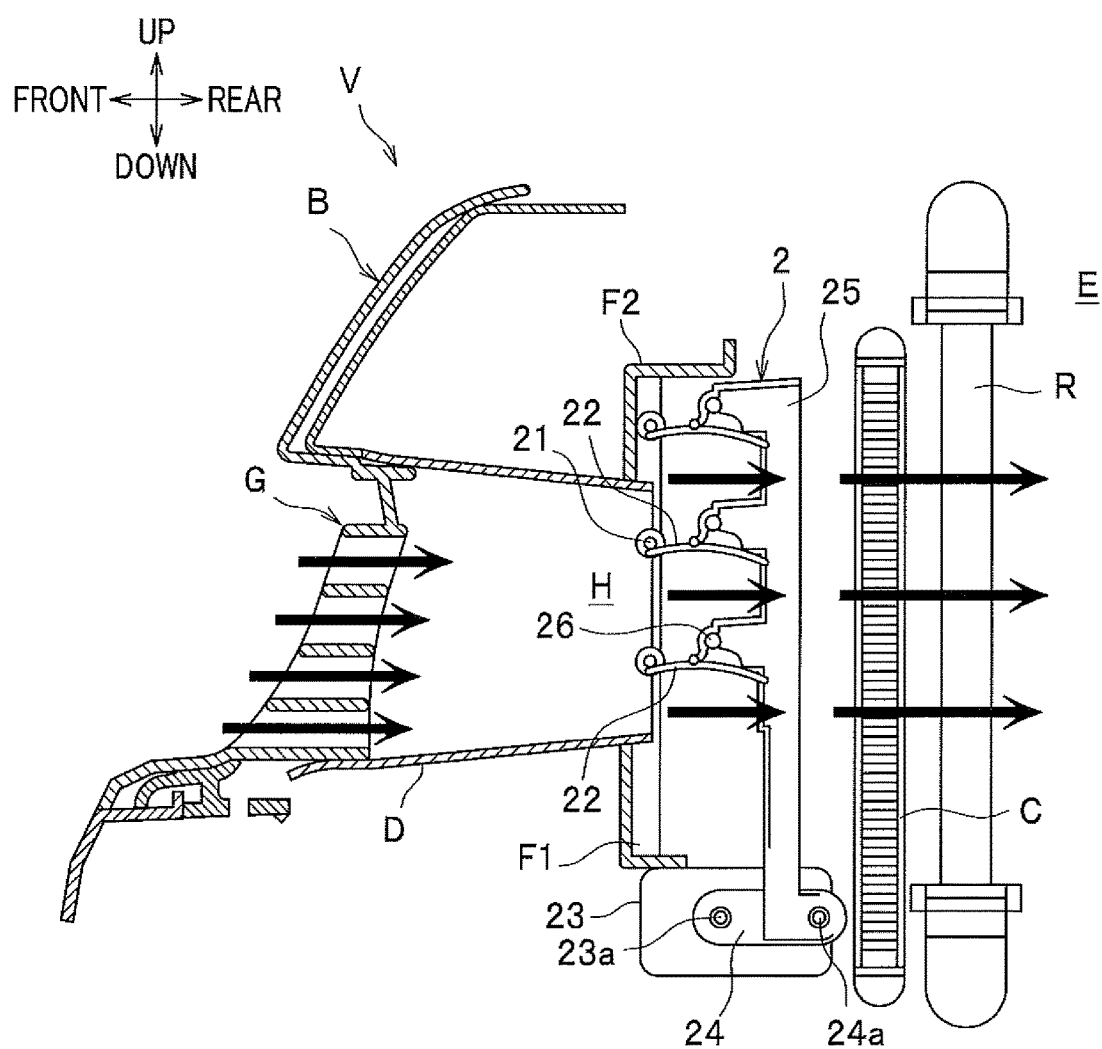
FIG. 1 is a cross-sectional view of a front part of a vehicle in a state where a shutter is opened by a control system according to a first embodiment of the invention.
Figure 3:
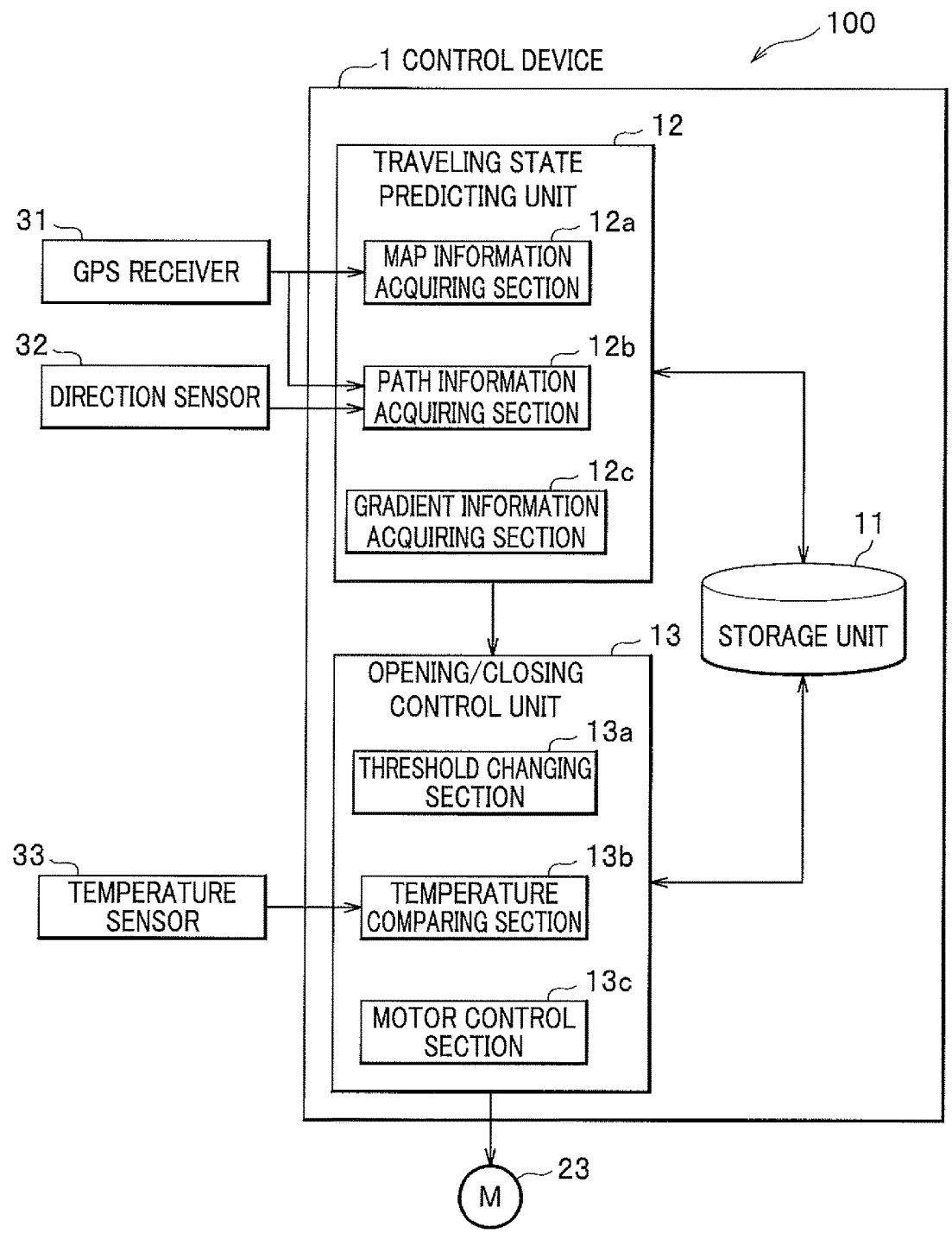
FIG. 3 is a functional block diagram related to the control system.

Prior to description of a control system 100 (a system for controlling opening/closing of a shutter 2: see FIG. 3) according to the present embodiment, description will be briefly given of the shutter 2 (see FIG. 1) that is opened and closed by the control system 100. FIG. 1 is a cross-sectional view of a front part B of a vehicle V in a state where the shutter 2 is opened by the control system 100 according to the first embodiment.

A duct D shown in FIG. 1 is a cylindrical body for introducing outside air into an engine room E (a driving source housing chamber) in which an engine (a driving source: not shown) is housed, and is disposed at the front part B of a vehicle body. A mesh-like front grille G is disposed near an upstream end of the duct D. A downstream end of the duct D forms an opening section H through which outside air is introduced into the engine room E. The shutter 2 capable of being opened and closed is disposed near the opening section H.

The shutter 2 is adapted to perform introduction/shut-off of outside air into the engine room E. The shutter 2 is provided with a plurality of shafts 21, a plurality of fins 22, a motor 23, an arm link 24, a slide link 25, and couplings 26.

The shafts 21 are adapted to rotatably support the fins 22, and extend in the vehicle width direction. The respective shafts 21 are fixed to a longitudinal support member F1, with being in a line at predetermined intervals in the up-down direction. Moreover, the support member F1 is fixed to a shutter base F2.

The fins 22 are each a long and narrow plate-like member that extends in the vehicle width direction, and rotatably disposed on the shafts 21 as described above. The motor 23 is a driving source that allows the fins 22 to be rotated, and adapted to rotate in a predetermined range of angle in response to a command sent from a control device 1 (see FIG. 3) as described later.

The arm link 24 allows the vicinity of one end thereof to be connected to a rotating shaft 23a of the motor 23 so as to be rotated by driving of the motor 23. The slide link 25 extends in the up-down direction and allows the vicinity of a lower end thereof to be connected via a connecting pin 24a to the vicinity of the other end of the arm link 24.

The couplings 26 are adapted to rotatably connect the fins 22 to the slide link 25, and extend in the horizontal direction. When driving of the motor 23 causes the connecting pin 24a to be moved in the form of an arc, the slide link 25 is adapted to parallelly move accordingly to allow the fins 22 to be rotated (i.e., to allow the shutter 2 to be opened or closed).

Note that the configuration of the shutter 2 shown in FIG. 1 is one example, and as long as the shutter can be opened and closed by driving of the motor 23, other configurations may be adopted.

Disposed at a rear side of the shutter 2 are a condenser C for condensing refrigerant of an air conditioner, and a radiator R for cooling the engine (not shown). In the state where the shutter 2 is opened as shown in FIG. 1, outside air (traveling wind) indicated by arrows is introduced into the engine room E, thereby cooling the condenser C and the radiator R.

Figure 2:
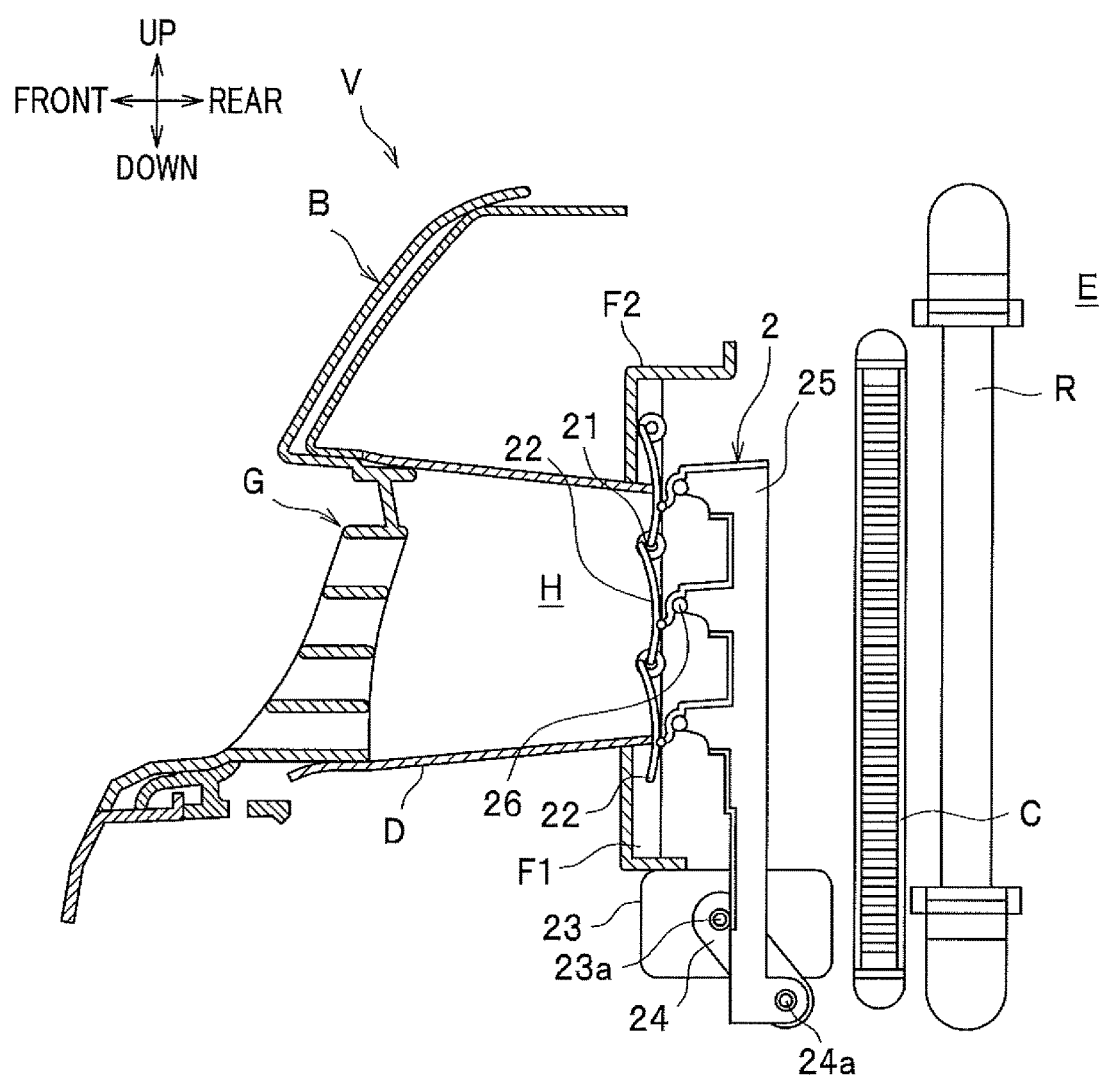
FIG. 2 is a cross-sectional view of the front part of the vehicle in a state where the shutter is closed by the control system.

FIG. 2 is a cross-sectional view of the front part B of the vehicle V in a state where the shutter 2 is closed by the control system 100.

When the shutter 2 is closed by the control system 100, the flow of air in the vehicle body is suppressed to reduce air resistance. Moreover, traveling wind flowing on the upper side of the vehicle body causes down-force which presses tires against a road surface, to be generated, thus making it possible to stabilize behavior of the vehicle V.

⟨Configuration of the Control System⟩

FIG. 3 is a functional block diagram related to the control system 100.

The control system 100 is a system that outputs a command signal to the motor 23 (see FIG. 1, FIG. 2 and FIG. 3) to perform opening/closing control of the shutter 2. The control system 100 includes a GPS receiver 31 (Global Positioning System receiver), a direction sensor 32, a temperature sensor 33 (a temperature detecting unit), and the control device 1.

The GPS receiver 31 is a device that receives radio waves from satellites in order to specify the present position (latitude and longitude) of the vehicle V. Note that a GPS antenna may be used in place of the GPS receiver 31.

The direction sensor 32 is a sensor that detects a direction for which the vehicle V is headed.

The temperature sensor 33 is a sensor that detects, for example, a temperature in the engine room E (see FIG. 1). Note that the temperature sensor 33 may be used to directly detect a temperature of the engine (not shown). Alternatively, the temperature of the engine may be indirectly detected by detecting a temperature of cooling water flowing through the radiator R (see FIG. 1).

The control device 1 includes, although not shown, a CPU (Central Processing Unit), a ROM (Read Only Memory), a RAM (Random Access Memory), and electronic circuits (not shown) such as various interfaces. The CPU is adapted to read programs stored in the ROM to develop them in the RAM and execute various processing. Moreover, the control device 1 is adapted to control car navigation based on user operation and display the present position of the vehicle V and the traveling path on a display (not shown).

As shown in FIG. 3, the control device 1 includes a storage unit 11 that stores various information as described later, a traveling state predicting unit 12 that predicts a traveling state of the vehicle V, and an opening/closing control unit 13 that controls opening/closing of the shutter 2 (see FIG. 1).

The storage unit 11 is, for example, a semiconductor memory device. The storage unit 11 stores therein programs related to the traveling state predicting unit 12 and the opening/closing control unit 13, and information related to temperature thresholds (threshold values) which are each a criterion of whether to perform opening/closing of the shutter 2 or not. Also, the storage unit 11 has a function of storing therein map information, path information, gradient information and the like as described below.

The traveling state predicting unit 12 has a function of predicting a traveling state of the vehicle V after a lapse of a predetermined time Δt (e.g. a few seconds) from the present time, based on the map information and the path information. The traveling state predicting unit 12 includes a map information acquiring section 12a, a path information acquiring section 12b, and a gradient information acquiring section 12c.

The map information acquiring section 12a has a function of acquiring map information related to a map around the vehicle V. That is, the map information acquiring section 12a specifies the present position of the vehicle V based on radio waves which the GPS receiver 31 receives from the satellites, and acquires the map information related to the map around the vehicle V. Moreover, as for a supply source of the map information, the storage unit 11 may store therein map information covering a wide range of areas beforehand, and/or the latest map information may be received from a server (not shown).

The path information acquiring section 12b has a function of acquiring path information related to paths on which the vehicle V travels. As an example, the path information acquiring section 12b acquires (predicts) path information related to a path on which the vehicle V travels, based on the present position of the vehicle V, a heading for which the vehicle V is traveling, and a destination specified by user operation. Note that the heading for which the vehicle V is traveling is specified based on a detection value of the direction sensor 32.

Incidentally, the "path information" can be acquired even in a case where the destination is not specified by the user. For example, where no branch path is found in the traveling direction of the vehicle V, the path on which the vehicle V will travel until the predetermined time Δt (e.g. a few seconds) elapses is normally determined. In this case, the path information acquiring section 12b predicts the path on which the vehicle V travels, based on the map information (inclusive of the present position of the vehicle V), and the heading for which the vehicle V is traveling.

The gradient information acquiring section 12c has a function of acquiring gradient information related to gradients of paths on which the vehicle V travels, based on the path information acquired by the path information acquiring section 12b. For example, the gradient information acquiring section 12c calculates a vehicle speed based on detection values of wheel speed sensors (not shown), predicts a position of the vehicle V when the predetermined time Δt elapses, and acquires gradient information related to the position. The gradient information is information indicating, for example, which of an up-grade, a horizontal road (level road) and a down-grade a road including the above position comes under, and stored in the storage unit 11 with being associated with each road specified by the path information.

The opening/closing control unit 13 has a function of bringing the shutter 2 (see FIG. 1) into an open state when a detection value of the temperature sensor 33 (a temperature in the engine room E) exceeds a predetermined temperature threshold, and introducing outside air into the engine room E to cool the machinery.

Moreover, the opening/closing control unit 13 has a function of bringing the shutter 2 into a closed state when the detection value of the temperature sensor 33 is equal to or lower than the predetermined temperature threshold, and decreasing air resistance of the vehicle V and increasing down-force to stabilize behavior of the vehicle V.

The opening/closing control unit 13 includes a threshold changing section 13a, a temperature comparing section 13b, and a motor control section 13c.

The threshold changing section 13a has a function of changing a temperature threshold which is a criterion of whether to perform opening/closing of the shutter 2 (see FIG. 1) or not, based on the traveling state of the vehicle V after the lapse of the predetermined time Δt predicted by the traveling state predicting unit 12. Note that the storage unit 11 stores therein beforehand a temperature threshold in normal time (e.g. in a case where the vehicle continues to go straight on a monotonous horizontal road), and an amount of change within which the temperature threshold is raised or lowered.

The temperature comparing section 13b has a function of comparing a temperature threshold output from the threshold changing section 13a with a detection value of the temperature sensor 33 to output a comparison result to the motor control section 13c.

The motor control section 13c controls the motor 23 to open the shutter 2 (see FIG. 1) when it is determined by the temperature comparing section 13b that the detection value of the temperature sensor 33 exceeds the predetermined temperature threshold. Also, the motor control section 13c controls the motor 23 to close the shutter 2 when it is determined by the temperature comparing section 13b that the detection value of the temperature sensor 33 is equal to or lower than the predetermined temperature threshold.

⟨Processing by the Control Device⟩

Figure 4:
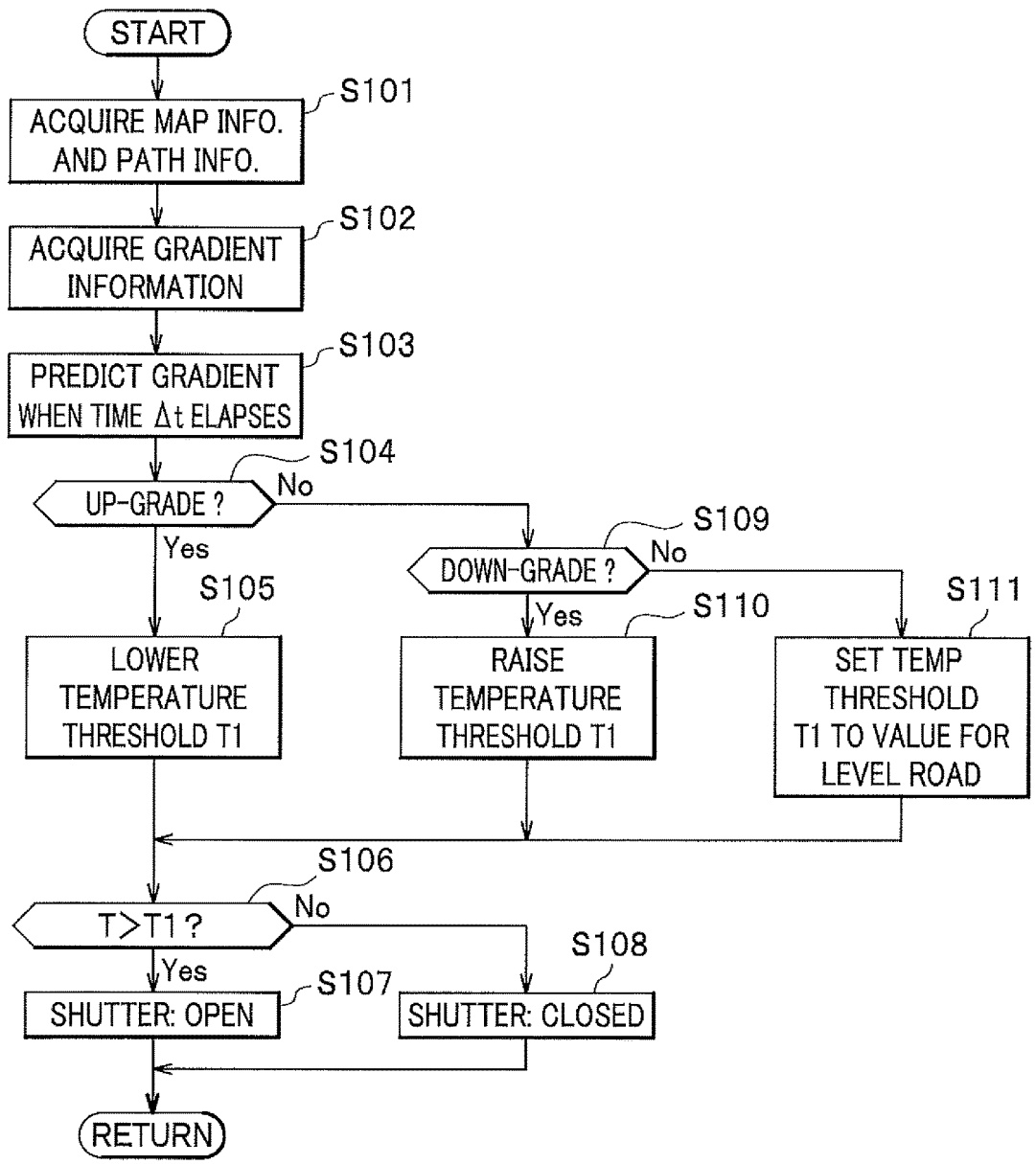
FIG. 4 is a flowchart showing processing executed by a control device.

FIG. 4 is a flowchart showing processing executed by the control device 1.

In step S101, the control device 1 acquires map information by means of the map information acquiring section 12a and acquires path information by means of the path information acquiring section 12b. That is, the control device 1 predicts a path on which the vehicle V is going to travel, based on the present position of the vehicle V and the heading (direction) of the vehicle V.

In step S102, the control device 1 acquires gradient information by means of the gradient information acquiring section 12c, based on the path information acquired in step S101.

In step S103, the control device 1 predicts a gradient of the road (for example, which of an up-grade, a nearly level road, and a down-grade the road comes under) on which the vehicle V travels when the predetermined time Δt elapses from the present time, based on the gradient information acquired in step S102.

In step S104, the control device 1 determines whether or not a prediction result in step S103 indicates an up-grade. Where the prediction result in step S103 indicates the up-grade (S104:Yes), the processing by the control device 1 proceeds to step S105.

In step S105, the control device 1 lowers a temperature threshold T1 which is used in opening/closing of the shutter 2, by means of the threshold changing section 13a. For example, the control device 1 changes the temperature threshold T1 to a lower value than when the vehicle V travels on a level road, thereby bringing the shutter 2 into a state of being easily opened.

Note that, as for a case where there is an uphill road over a long distance (namely, where a determination result indicating an "up-grade" is repeated), the temperature threshold T1 may be set to a relatively low constant value, or the temperature threshold T1 may be set to be lower as the gradient becomes greater.

In step S106, the control device 1 determines whether or not a detection value T of the temperature sensor 33 (a temperature in the engine room E) exceeds the temperature threshold T1 changed in step S105. Where the detection value T of the temperature sensor 33 exceeds the temperature threshold T1 (S106:Yes), the processing by the control device 1 proceeds to step S107.

In step S107, the control device 1 brings the shutter 2 into an open state. More specifically, where the shutter 2 is closed before the processing of step S107, the control device 1 allows the shutter 2 to be opened. Also, where the shutter 2 is open before the processing of step S107, the control device 1 maintains the open state.

Moreover, in step S106, where the detection value T of the temperature sensor 33 is equal to or lower than the temperature threshold T1 (S106:No), the processing by the control device 1 proceeds to step S108.

In step S108, the control device 1 brings the shutter 2 into a closed state.

Figure 5:
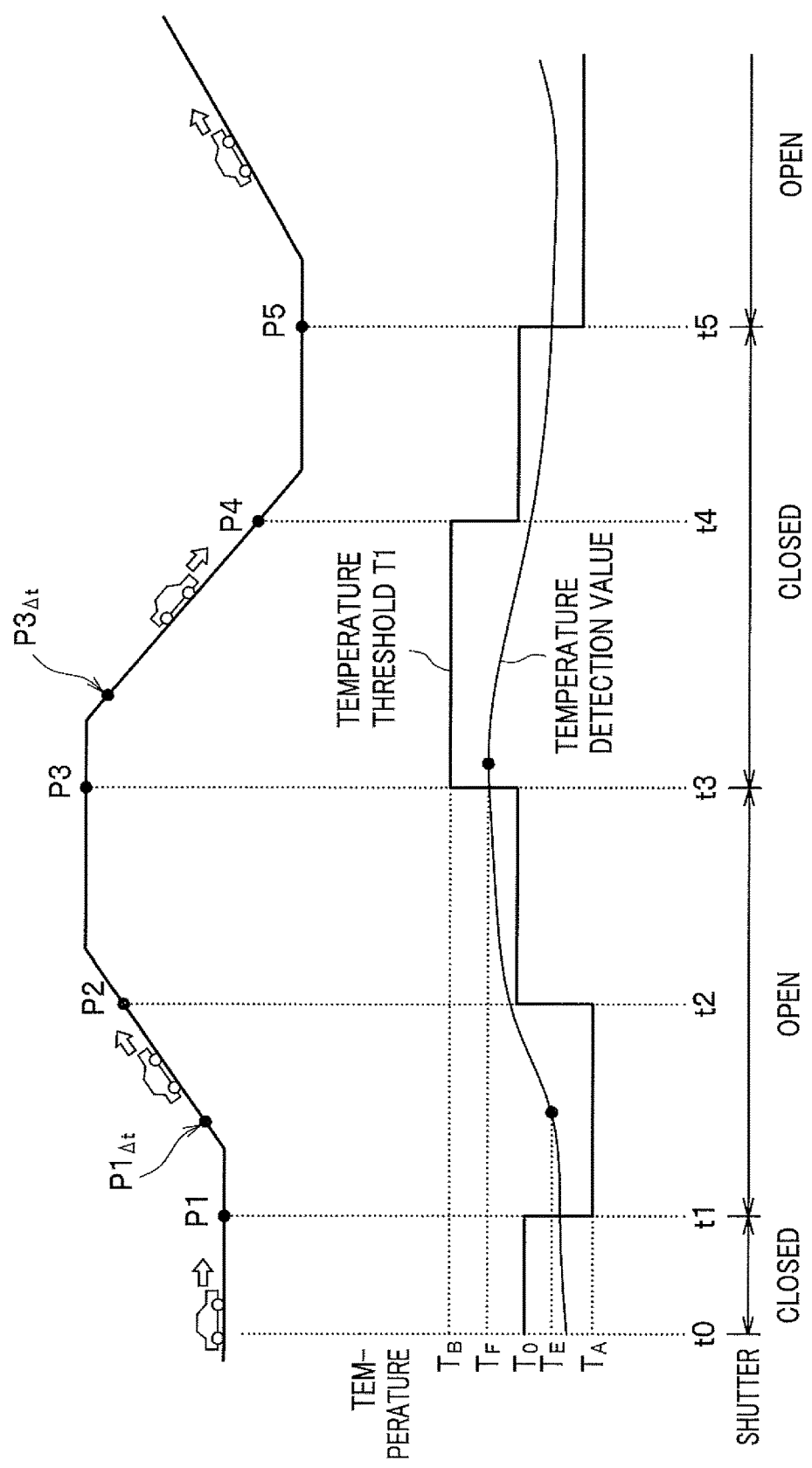
FIG. 5 is an explanatory diagram showing a gradient of a road on which the vehicle travels, a change in a temperature threshold, a temperature detection value, and an open/closed state of the shutter.

FIG. 5 is an explanatory diagram showing a gradient of the road on which the vehicle V travels, a change in the temperature threshold T1, a temperature detection value (the detection value T of the temperature sensor 33), and an open/closed state of the shutter 2.

For example, when the vehicle V travels on a position P1, the control device 1 predicts a gradient at a position $P1_{\Delta t}$ of the vehicle V after a lapse of the predetermined time Δt (S103). Since the position $P1_{\Delta t}$ is in the up-grade (S104: Yes), the control device 1 changes the temperature threshold T1 used in opening/closing of the shutter 2, to a temperature $T_A$ lower than a temperature $T_O$ used when traveling on a level road (S105).

This allows the shutter 2 to be opened (S107) even at a temperature at which the shutter 2 is brought into a closed state (e.g. a temperature $T_E$ shown in FIG. 5) when traveling on the level road, where the temperature exceeds the temperature $T_A$ which is the changed temperature threshold T1 (S106:Yes).

Note that, when traveling on an uphill road, a rotation speed of the engine (not shown) is increased and a flow rate of traveling wind flowing into the engine room E is decreased as compared to when traveling on the level road, thus allowing the temperature of the engine and in the engine room E to easily rise. As described above, lowering the temperature threshold T1 to positively open the shutter 2 makes it possible to cool the machinery such as the engine by the traveling wind. Therefore, malfunction of the machinery associated with a temperature rise in the engine room E can be prevented.

Moreover, where it is predicted that the vehicle V travels on the up-grade (S104:Yes), the temperature threshold T1 is lowered before the vehicle V comes near to the up-grade (see S105, and times t1, t5 in FIG. 5). That is, when the vehicle V begins to travel on the up-grade, the shutter 2 has been already brought into a state of being easily opened, thus making it possible to appropriately cool the machinery such as the engine as compared to the conventional art.

In FIG. 4, where the prediction result in step S103 does not indicate the up-grade (S104:No), the processing by the control device 1 proceeds to step S109. In step S109, the control device 1 determines whether or not the prediction result in step S103 indicates a down-grade. Where the prediction result in step S103 indicates the down-grade (S109:Yes), the processing by the control device 1 proceeds to step S110.

In step S110, the control device 1 raises the temperature threshold T1 which is used in opening/closing of the shutter 2, by means of the threshold changing section 13a. For example, the control device 1 changes the temperature threshold T1 to a higher value than when the vehicle V comes near to a level road, thereby bringing the shutter 2 into a state of being easily closed.

Note that, as for a case where there is a downhill road over a long distance (namely, where a determination result indicating a "down-grade" is repeated), the temperature threshold T1 may be set to a relatively high constant value, or the temperature threshold T1 may be set to be higher as the gradient becomes greater.

After executing the processing of step S110, the control device 1 executes the processing of step S106 to S108.

In the example shown in FIG. 5, since a position $P3_{\Delta t}$ of the vehicle V, which is after a lapse of the predetermined time $\Delta t$ from the present time at which the vehicle V travels on a position P3, is in the down-grade (S109:Yes), the control device 1 changes the temperature threshold T1 used in opening/closing of the shutter 2, to a temperature $T_B$ higher than the temperature $T_0$ used when traveling on a level road (S110). When traveling on a downhill road, a rotation speed of the engine (not shown) is decreased and a flow rate of traveling wind flowing into the engine room E is increased as compared to when traveling on the level road, thus allowing the temperature of the engine and in the engine room E to be hard to rise. Therefore, raising the temperature threshold T1 to positively close the shutter 2 before coming to the down-grade makes it possible to generate down-force by air flowing on the upper side of the vehicle V and thus to stabilize behavior of the vehicle V.

In FIG. 4, where the prediction result in step S103 does not indicate the up-grade (S104:No), nor the down-grade (S109:No), the processing by the control device 1 proceeds to step S111.

In step S111, the control device 1 sets the temperature threshold T1 which is used in opening/closing of the shutter 2, to a value used when traveling on a level road, by means of the threshold changing section 13a. For example, when traveling on an up-grade at the present time, the control device 1 changes the temperature threshold T1 from the temperature $T_A$ (see FIG. 5) to the temperature $T_0$ (see FIG. 5). After executing the processing of step S111, the control device 1 executes the processing of step S106 to S108.

Note that the sequential processing shown in FIG. 4 is repeatedly executed at a given cycle (RETURN).

Moreover, the predetermined time $\Delta t$ (e.g. 1 to 10 seconds) used in prediction of the gradient, the period (e.g. 1 to 10 seconds) with which the prediction is performed, and the timing at which the prediction result is reflected on a change of the temperature threshold T1 (e.g. reflected immediately after the prediction), are set based on pre-experimentation in advance.

⟨Advantageous Effects⟩

According to the present embodiment, the control device 1 predicts the gradient (traveling state) of the vehicle V when the predetermined time $\Delta t$ elapses from the present time, and changes the temperature threshold T1 used in opening/closing of the shutter 2, based on the prediction result. More specifically, lowering the temperature threshold T1 to positively open the shutter 2 before coming near to the up-grade makes it possible to appropriately cool the machinery such as the engine. Moreover, raising the temperature threshold T1 to positively close the shutter 2 before coming near to the down-grade makes it possible to enhance aerodynamic performance of the vehicle V. Thus, the present embodiment makes it possible to suppress thermally adverse influence exerted on the machinery and to stabilize behavior of the vehicle V on the whole travel path of the vehicle V.

Second Embodiment

The second embodiment is different from the first embodiment in that a grip force change predicting section 12d (see FIG. 6) predicts presence or absence of a change in grip force, and when performing opening/closing of the shutter 2, a temperature threshold and an opening/closing speed are changed based on the prediction result. Note that in a control device 1A (see FIG. 6), the configurations other than the grip force change predicting section 12d and an opening/closing speed changing section 12e are the same as those in the first embodiment (see FIG. 3). Therefore, description is given of parts different from the first embodiment, and description is omitted for duplicate parts.

Figure 6:
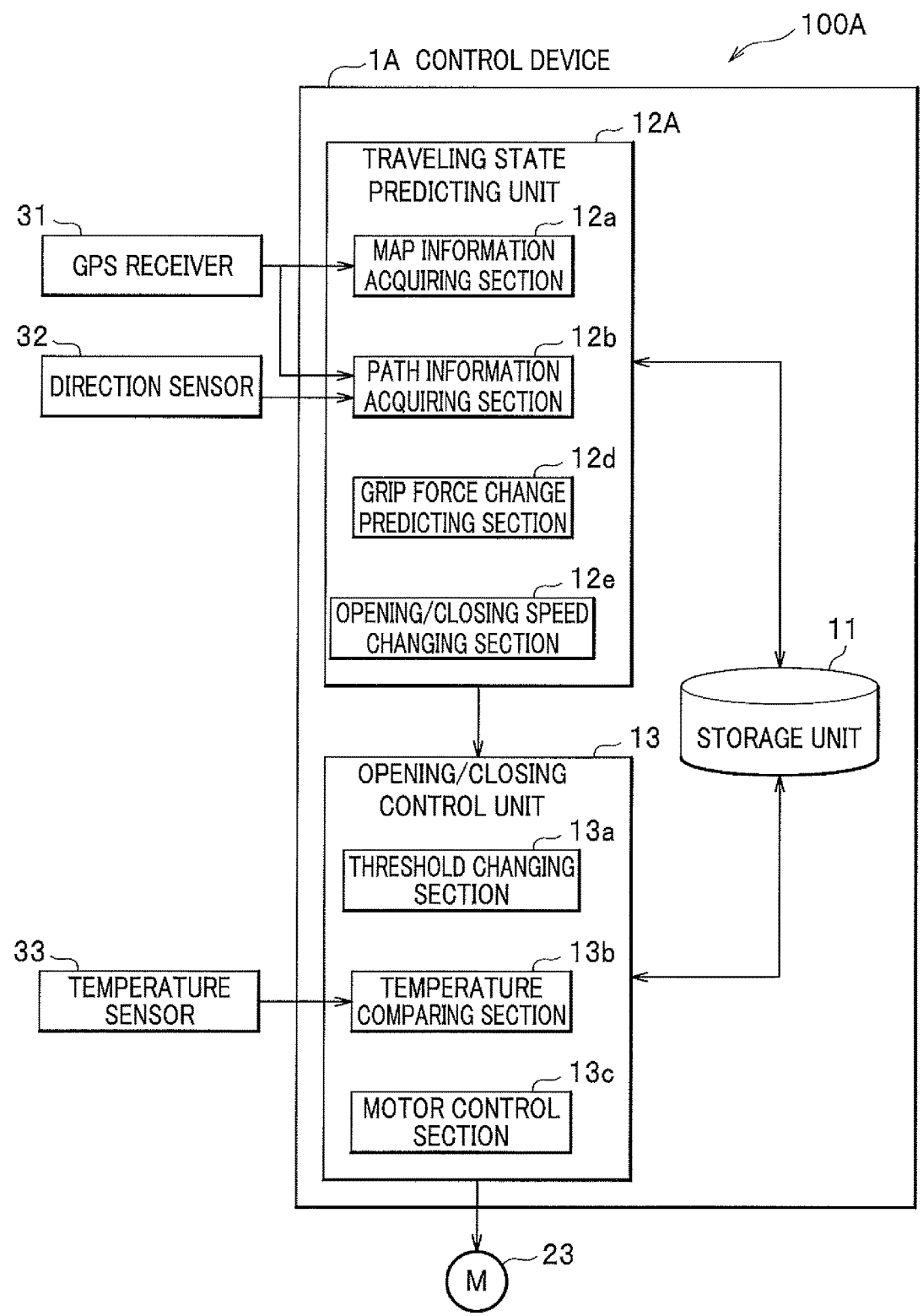
FIG. 6 is a functional block diagram related to a control system according to a second embodiment of the invention.

FIG. 6 is a functional block diagram related to a control system 100A according to the second embodiment.

As shown in FIG. 6, a traveling state predicting unit 12A of the control device 1A includes the map information acquiring section 12a, the path information acquiring section 12b, the grip force change predicting section 12d, and the opening/closing speed changing section 12e.

The grip force change predicting section 12d predicts whether or not there is a change in the grip force of the vehicle V (whether the amount of change in the grip force is relatively large or not) when the predetermined time $\Delta t$ elapses from the present time as a reference, based on the path information acquired by the path information acquiring section 12b.

As an example, where a radius of curvature of a path on which the vehicle V is going to travel is relatively small (i.e. just before coming to a curve), the grip force change predicting section 12d predicts that "there is a change" in the grip force. Note that, when traveling on a curve, a centrifugal force is exerted on the vehicle V and the load is shifted to allow the grip force of each of the tires to be changed, thus allowing behavior of the vehicle V to easily become unstable. Although particulars are described later, when the grip force change predicting section 12d predicts that "there is a change" in the grip force, the temperature threshold T1 is changed so as to maintain the open/closed state at the present time of the shutter 2, in order to stabilize behavior of the vehicle V.

Note that, while passing through a tunnel, a bridge, a valley in a mountainous area, a break in a soundproof wall or the like, besides the above curve, a force of wind in the front-rear and/or side direction blowing against the vehicle V changes, and the grip force of the vehicle V also changes accordingly. Therefore, even in a case where it is predicted that the vehicle V comes near to a tunnel or the like after the lapse of the predetermined time $\Delta t$ from the present time, the grip force change predicting section 12d predicts that "there is a change" in the grip force.

The opening/closing speed changing section 12e has a function of, when the grip force change predicting section 12d predicts that "there is a change" in the grip force of the vehicle V, making the opening/closing speed of the shutter 2 slower than normal time (a case where there is no change in the grip force of the vehicle V, or the amount of change in the grip force is small).

Figure 7:
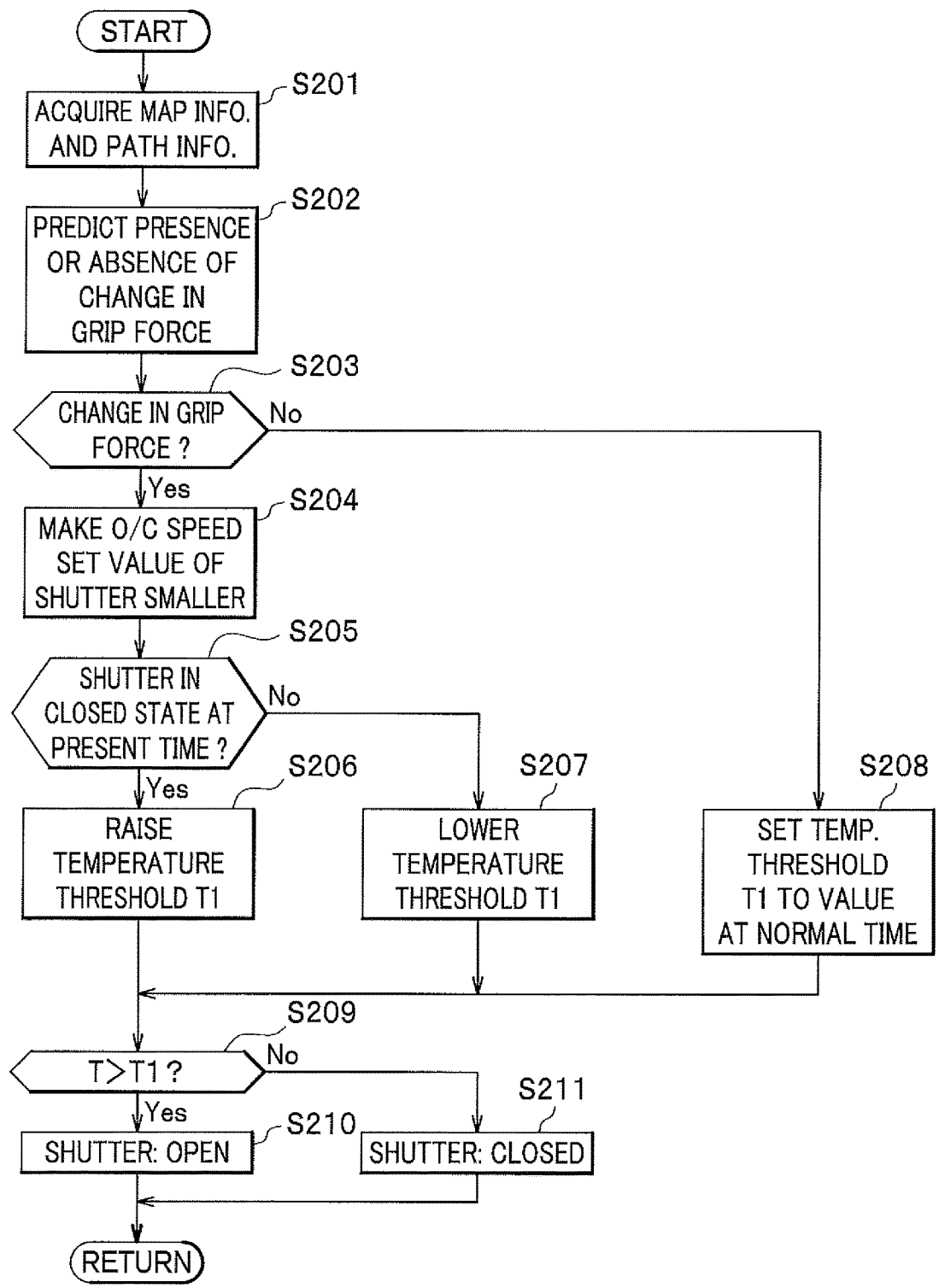
FIG. 7 is a flowchart showing processing executed by a control device.

FIG. 7 is a flowchart showing processing executed by the control device 1A.

In step S201, the control device 1A acquires map information and path information.

In step S202, the control device 1A predicts presence or absence of a change in grip force of the vehicle V, by means of the grip force change predicting section 12d, based on the path information acquired in step S201. That is, the control device 1A predicts whether or not there is a curve, a tunnel, a bridge, a valley in a mountainous area, a break in a soundproof wall or the like, in a path on which the vehicle V is predicted to travel after the lapse of the predetermined time $\Delta t$ (e.g. a few seconds) from the present time.

In step S203, the control device 1A determines whether or not there is a change in the grip force, based on a prediction result in step S202. Where there is a change in the grip force (S203:Yes), the processing by the control device 1A proceeds to step S204.

In step S204, the control device 1A makes an opening/closing speed set value of the shutter 2 smaller than normal time. More specifically, the control device 1A makes the opening/closing speed set value smaller so as to allow opening/closing of the shutter 2 to be performed slower than when traveling on a monotonous road where there is no change in the grip force (or the amount of change is small). This makes it possible, for example, even when the shutter 2 is opened (step S210 as described later) while traveling on a curve, to suppress a change in behavior of the vehicle V by making the opening speed of the shutter 2 slower than normal time.

In step S205, the control device 1A determines whether or not the shutter 2 is in the closed state at the present time. Where the shutter 2 is in the closed state at the present time (S205:Yes), the processing by the control device 1A proceeds to step S206.

In step S206, the control device 1A raises the temperature threshold T1 which is a criterion used in opening/closing of the shutter 2. That is, the control device 1A makes the temperature threshold T1 higher than when it is predicted that the amount of change in the grip force is small. Thus, the temperature threshold T1 is raised before the traveling state of the vehicle V changes, thereby allowing the shutter 2 to be easily maintained at the closed state. Therefore, a change in the grip force due to a change in the traveling state of the vehicle V and a change in the grip force due to the opening operation of the shutter 2 are hardly caused concurrently with respect to time, thus making it possible to suppress a change in behavior of the vehicle V.

Moreover, in step S205, where the shutter 2 is in the open state at the present time (S205:No), the processing by the control device 1A proceeds to step S207.

In step S207, the control device 1A lowers the temperature threshold T1 which is a criterion used in opening/closing of the shutter 2. That is, the control device 1A makes the temperature threshold T1 lower than when traveling on a path where the amount of change in the grip force is small. This allows the shutter 2 to be easily maintained at the open state, thus making it possible to suppress a change in behavior of the vehicle V as described above.

Moreover, in step S203, where there is no change in the grip force (S203:No), the processing by the control device 1A proceeds to step S208.

In step S208, the control device 1A sets the temperature threshold T1 which is a criterion used in opening/closing of the shutter 2, to a value at normal time. Herein, the "normal time" corresponds to a case where the vehicle continues to go straight on a monotonous road where there is no curve, tunnel or the like.

After executing the processing of step S206, S207 or S208, the processing by the control device 1A proceeds to step S209. Note that steps S209 to S211 are the same as the steps S106 to S108 (see FIG. 4) explained in the first embodiment and thus explanation thereof is omitted. The control device 1A repeats the sequential processing shown in FIG. 7 at a given cycle (RETURN).

⟨Advantageous Effects⟩

According to the present embodiment, when it is predicted that the grip force of the vehicle V changes due to a change in the traveling state (S203:Yes), the control device 1A makes the opening/closing speed set value of the shutter 2 smaller (S204). This makes it possible, even when the shutter 2 is opened or closed while traveling on a curve or the like, to reduce a change in behavior of the vehicle V.

Moreover, when it is predicted that the grip force of the vehicle V changes (S203:Yes), the control device 1A changes the temperature threshold T1 so as to allow the open/closed state of the shutter 2 at the present time to be easily maintained (S205 to S207). Therefore, a change in the grip force due to a change in the traveling state of the vehicle V and a change in the grip force due to the opening/closing of the shutter 2 are hardly caused concurrently with respect to time, thus making it possible to suppress a change in behavior of the vehicle V.

Third Embodiment

The third embodiment is different from the first embodiment in that the predetermined time $\Delta t$ used in prediction of the traveling state, and a period with which the prediction is performed, are changed based on whether it is predicted or not that the traveling state of the vehicle V frequently changes. Note that in a control device 1B (see FIG. 8), the configurations other than a traveling state determining section 12f, a time changing section 12g and a prediction period changing section 12h are the same as those explained in the first embodiment (see FIG. 3). Therefore, description is given of parts different from the first embodiment, and description is omitted for duplicate parts.

Figure 8:
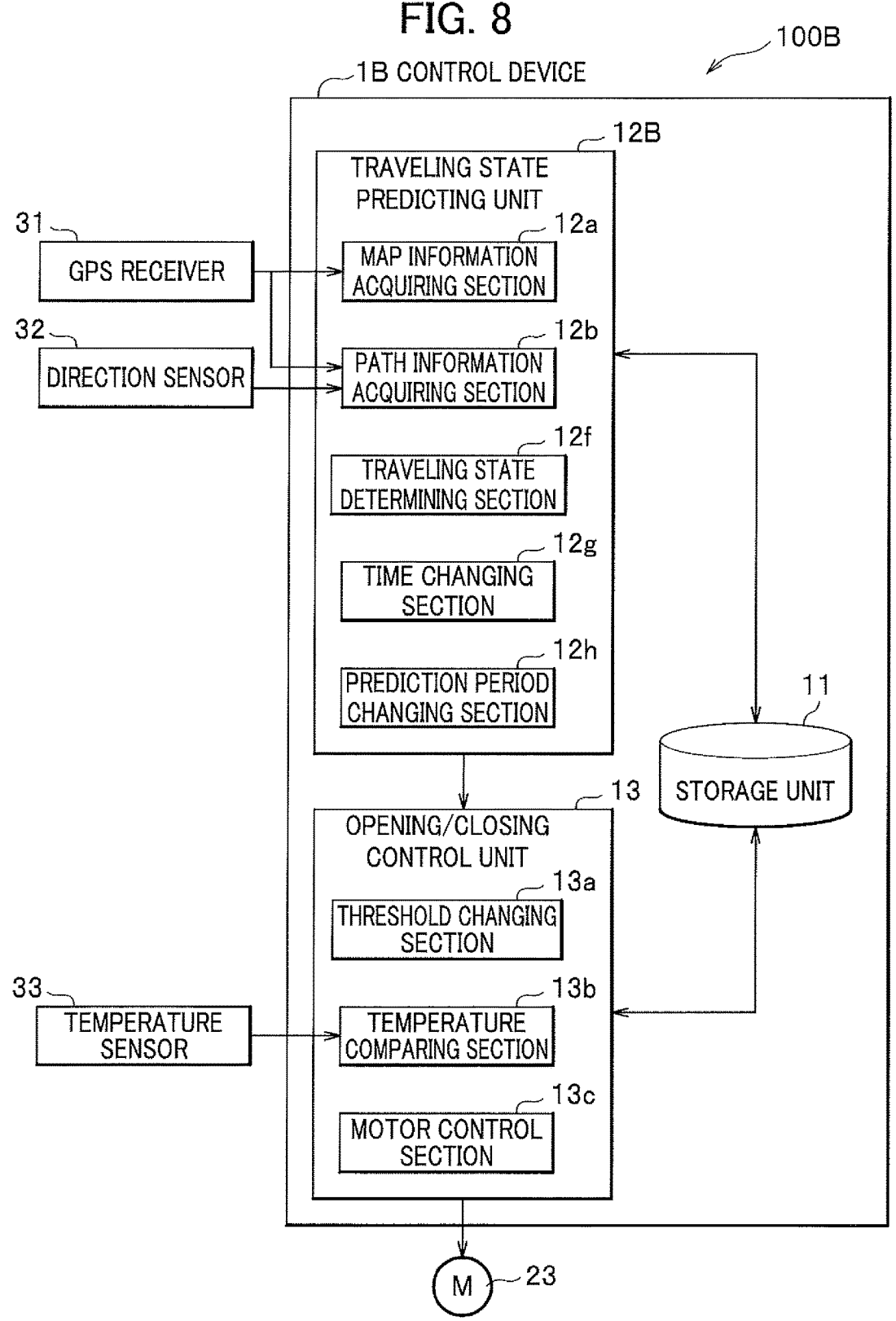
FIG. 8 is a functional block diagram related to a control system according to a third embodiment of the invention.

FIG. 8 is a functional block diagram related to a control system 100B according to the third embodiment.

As shown in FIG. 8, a traveling state predicting unit 12B of the control device 1B includes the map information acquiring section 12a, the path information acquiring section 12b, the traveling state determining section 12f, the time changing section 12g, and the prediction period changing section 12h.

The traveling state determining section 12f has a function of determining, based on the map information and the path information, whether the traveling state of the vehicle V frequently changes or not, with respect to a relatively wide range of area including the present position of the vehicle V (farther ahead of a point on which the vehicle V is predicted to travel after the lapse of the predetermined time Δt). The "traveling state" described above includes a gradient of the road, a curve, a tunnel, a bridge, a valley in a mountainous area, a break in a soundproof wall, and presence or absence of traffic jam and transfer from a general road to an expressway.

The time changing section 12g changes the "predetermined time Δt" when predicting the traveling state of the vehicle V after the lapse of the predetermined time Δt from the present time, based on a determination result of the traveling state determining section 12f. More specifically, the time changing section 12g sets the "predetermined time Δt" to be shorter when it is predicted that the traveling state of the vehicle V frequently changes, and sets the "predetermined time Δt" to be longer when it is predicted that the traveling state of the vehicle V is monotonous.

The prediction period changing section 12h changes a period (prediction period) with which the traveling state of the vehicle V is predicted, based on the determination result of the traveling state determining section 12f. More specifically, the prediction period changing section 12h sets the prediction period to be shorter when it is predicted that the traveling state of the vehicle V frequently changes, and sets the prediction period to be longer when it is predicted that the traveling state of the vehicle V is monotonous.

Figure 9:
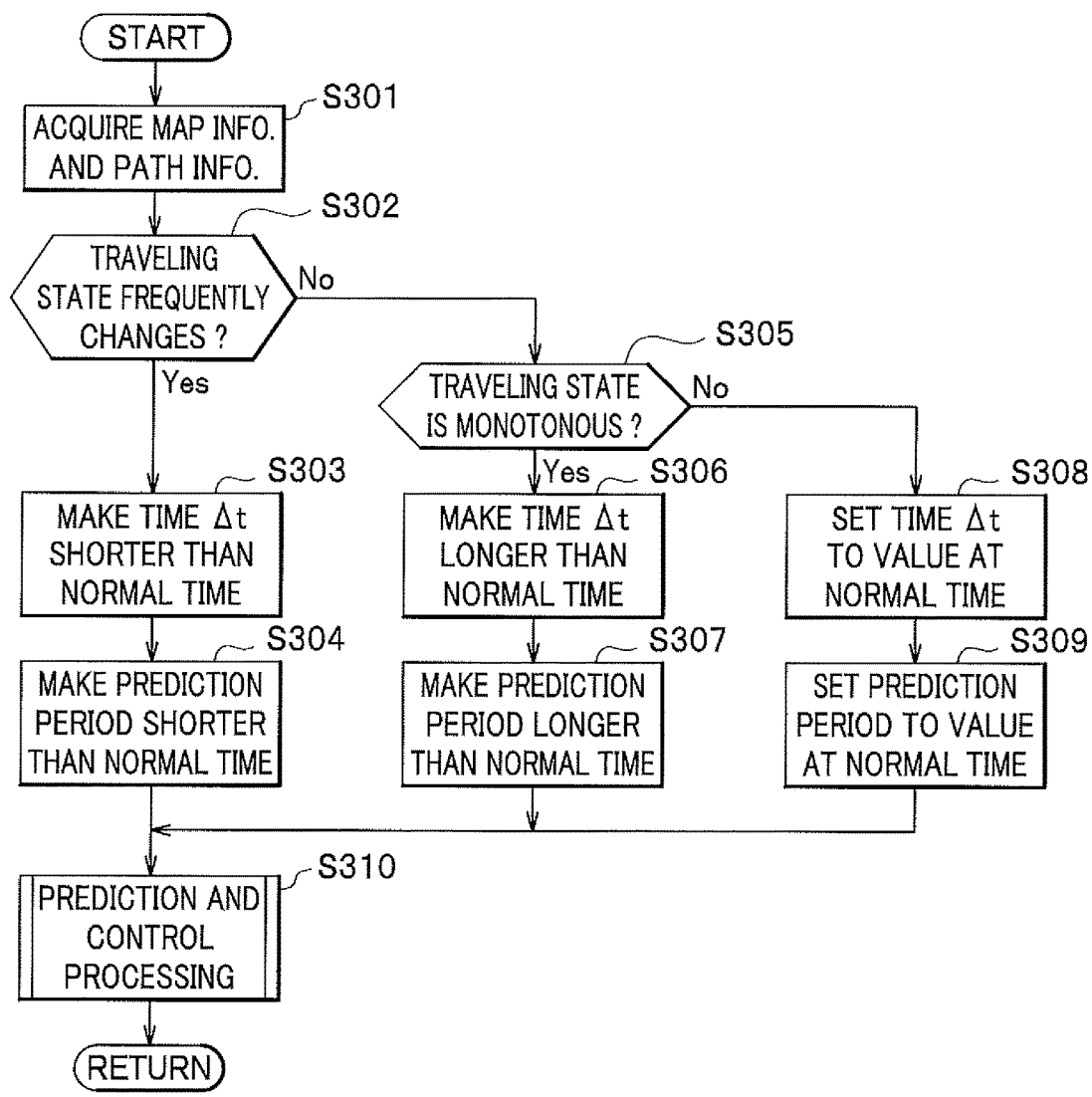
FIG. 9 is a flowchart showing processing executed by a control device.

FIG. 9 is a flowchart showing processing executed by the control device 1B.

In step S301, the control device 1B acquires map information and path information. More specifically, the control device 1B acquires map information covering a relatively wide range of area including the present position of the vehicle V (e.g. a range of a few kilometers ahead of the present position), and the like.

In step S302, the control device 1B determines, based on the map information and the path information acquired in step S301, whether or not the traveling state of the vehicle V frequently changes in a path on which the vehicle is going to travel, by means of the traveling state determining section 12f.

Where the traveling state of the vehicle V frequently changes in the path on which the vehicle is going to travel (S302:Yes), the processing by the control device 1B proceeds to step S303. As an example, the control device 1B counts the number of times it is predicted that the traveling state changes in a range of a few kilometers ahead of the present position, and when the above number of times is a predetermined threshold or more, determines that the conditions in step S302 are satisfied.

In step S303, the control device 1B changes the "predetermined time Δt" used in prediction of the traveling state after the lapse of the predetermined time Δt from the present time, to a shorter time than normal time, by means of the time changing section 12g.

In step S304, the control device 1B changes a period with which the traveling state of the vehicle V is predicted, to a shorter time than normal time, by means of the prediction period changing section 12h.

As an example, when it is predicted that the traveling state of the vehicle V frequently changes, the control device 1B changes the predetermined time Δt and the prediction period from five seconds (normal time) to one second, respectively. This makes it possible to perform opening/closing of the shutter 2 in advance in accordance with the traveling state that frequently changes.

In step S302, where it is not a path in which the traveling state of the vehicle V frequently changes (S302:No), the processing by the control device 1B proceeds to step S305.

In step S305, the control device 1B determines whether or not the traveling state of the vehicle V is monotonous in the path on which the vehicle is going to travel, by means of the traveling state determining section 12f. For example, when it is predicted that the vehicle continues to go straight on a monotonous path where there are hardly curves or gradients, the control device 1B determines that the traveling state of the vehicle V is monotonous. Where the traveling state of the vehicle V is monotonous (S305:Yes), the processing by the control device 1B proceeds to step S306.

In step S306, the control device 1B changes the "predetermined time Δt" used in prediction of the traveling state, to a longer time than normal time, by means of the time changing section 12g.

In step S307, the control device 1B changes a period with which the traveling state of the vehicle V is predicted, to a longer time than normal time, by means of the prediction period changing section 12h.

As an example, when it is predicted that the traveling state of the vehicle V is monotonous, the control device 1B changes the predetermined time Δt and the prediction period from five seconds (normal time) to ten seconds, respectively. This makes it possible to prevent the shutter 2 from being uselessly opened or closed in a case where the traveling state of the vehicle V is monotonous, and to reduce a change in behavior of the vehicle V.

In step S305, where the traveling state is not so monotonous (S305:No), the processing by the control device 1B proceeds to step S308.

In step S308, the control device 1B sets the "predetermined time Δt" used in prediction of the traveling state to a value at normal time (e.g. five seconds), by means of the time changing section 12g.

In step S309, the control device 1B sets a period with which the traveling state of the vehicle V is predicted, to a value at normal time (e.g. five seconds), by means of the prediction period changing section 12h.

After executing the processing of step S304, S307 or S309, the processing by the control device 1B proceeds to step S310.

In step S310, the control device 1B repeats the prediction and control processing. For the prediction and control processing, each processing in steps S102 to S108 (see FIG. 4) explained in the first embodiment may be performed, or each processing in steps S202 to S211 (see FIG. 7) explained in the second embodiment may be performed.

Note that, although omitted in FIG. 9, the processing by the control device 1B returns to "START" (RETURN) when the vehicle V comes near the boundary of the range indicated by the map information.

⟨Advantageous Effects⟩

According to the present embodiment, when it is predicted that there are many gradients and/or curves to allow the traveling state to frequently change (S302:Yes), the control device 1B sets the predetermined time Δt and the prediction period to be shorter, respectively (S303, S304). This makes it possible to increase the frequency at which opening/closing of the shutter 2 is performed, and thus to appropriately open/close the shutter 2 in accordance with the traveling state that frequently changes. Moreover, when it is predicted that the vehicle travels on a monotonous path where there are no gradient or curve (S305:Yes), the control device 1B sets the predetermined time Δt and the prediction period to be longer, respectively (S306, S307). This makes it possible to decrease the frequency at which opening/closing of the shutter 2 is performed, and thus to suppress a change in behavior of the vehicle V.

Fourth Embodiment

The fourth embodiment is different from the first embodiment in that a vehicle speed detecting section 12*i* (see FIG. 10) detects a vehicle speed and a traveling state change predicting section 12*j* (see FIG. 10) predicts a timing at which the traveling state of the vehicle V changes, and the temperature threshold T1 is changed before the timing is reached. Note that in a control device 1C (see FIG. 10), the configurations other than the vehicle speed detecting section 12*i* and the traveling state change predicting section 12*j* are the same as those explained in the first embodiment (see FIG. 3). Therefore, description is given of parts different from the first embodiment, and description is omitted for duplicate parts.

Figure 10:
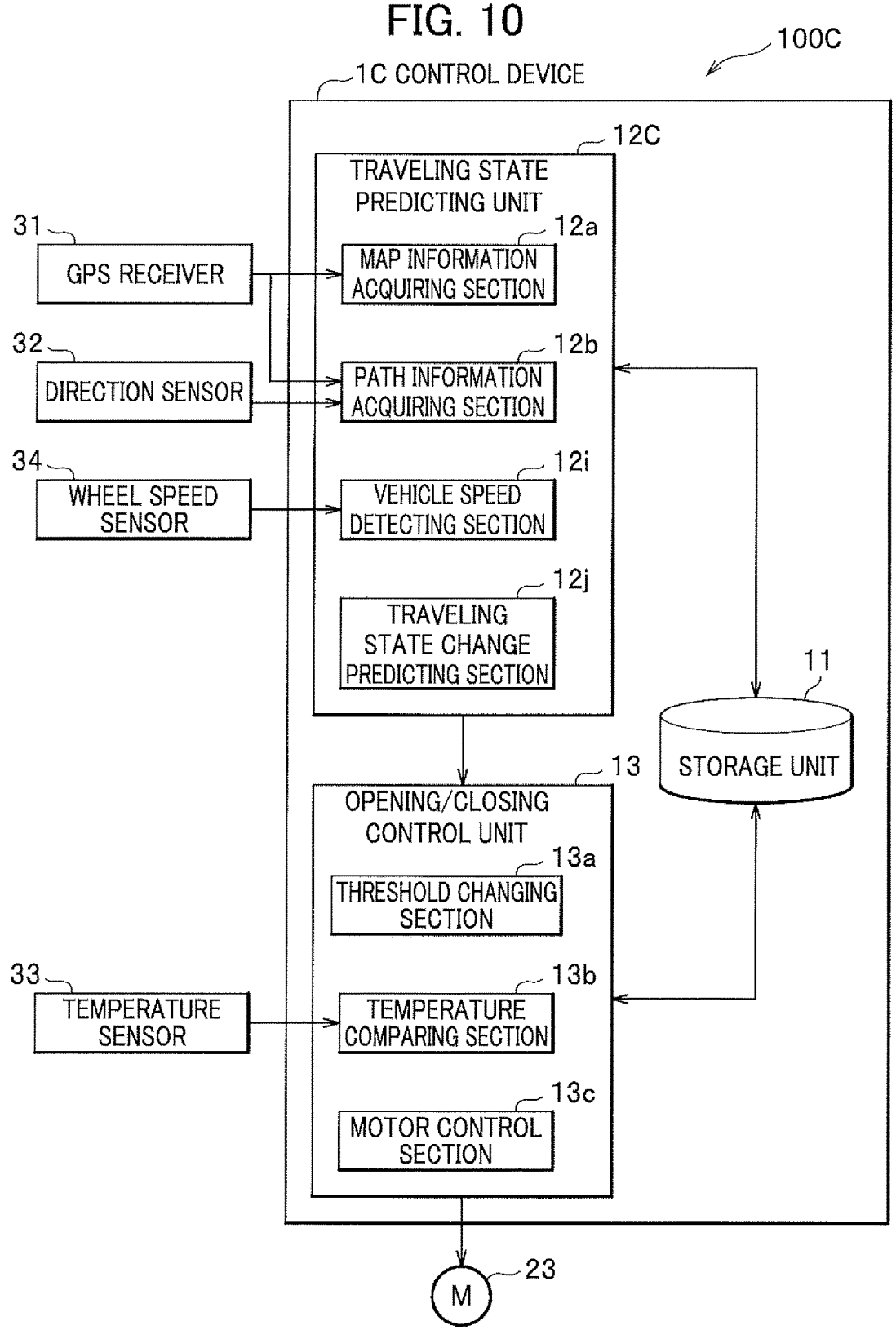
FIG. 10 is a functional block diagram related to a control system according to a fourth embodiment of the invention.

FIG. 10 is a functional block diagram related to a control system 100C according to the fourth embodiment.

As shown in FIG. 10, a traveling state predicting unit 12C of the control device 1C includes the map information acquiring section 12*a*, the path information acquiring section 12*b*, the vehicle speed detecting section 12*i*, and the traveling state change predicting section 12*j*.

The vehicle speed detecting section 12*i* detects (calculates) a vehicle speed which is a speed of the vehicle V, based on detection values of wheel speed sensors 34 that detect rotational speeds of each wheel of the vehicle V.

The traveling state change predicting section 12*j* predicts a timing at which the traveling state of the vehicle V changes, based on the vehicle speed detected by the vehicle speed detecting section 12*i*, the map information acquired by the map information acquiring section 12*a* and the path information acquired by the path information acquiring section 12*b*.

The "traveling state" described above includes a gradient of the road, a curve, a tunnel, a bridge, a valley in a mountainous area, a break in a soundproof wall, and presence or absence of traffic jam and transfer from a general road to an expressway. Moreover, the "timing" at which the traveling state changes includes a time at which the traveling state of the vehicle V changes (e.g. a time at which the vehicle enters a tunnel), and a point at which the traveling state of the vehicle V changes (e.g. latitude and longitude of an entrance of the tunnel). Prediction results of the traveling state change predicting section 12*j* are used for the change of the temperature threshold T1 by the threshold changing section 13*a*.

Figure 11:
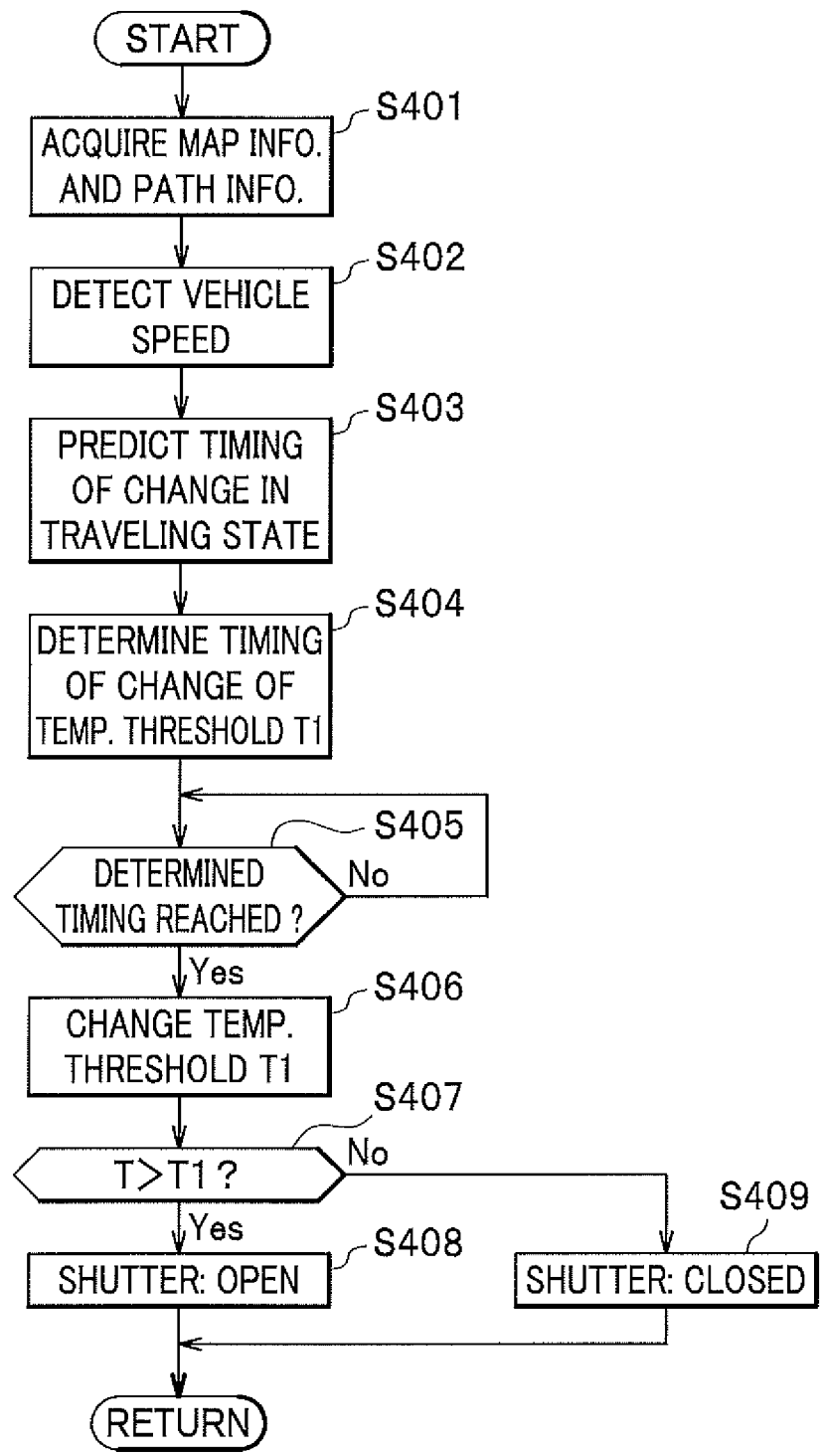
FIG. 11 is a flowchart showing processing executed by a control device.

FIG. 11 is a flowchart showing processing executed by the control device 1C.

In step S401, the control device 1C acquires map information and path information.

In step S402, the control device 1C detects (calculates) a vehicle speed at the present time by means of the vehicle speed detecting section 12*i*.

In step S403, the control device 1C predicts a timing at which the traveling state of the vehicle V changes, based on the map information and the path information acquired in step S401, and the vehicle speed detected in step S402. As an example, where there is a curve a few hundred meters ahead of the present position when traveling on a linear road, the control device 1C divides by the vehicle speed a distance to a point at which the vehicle comes near to the curve, thereby calculating a timing (time) at which the vehicle comes near to the curve.

Note that, in place of the processing of step S403, the control device 1C may predict the traveling state of the vehicle V after the lapse of the predetermined time Δt from the present time, and when predicting that "there is a change" in the traveling state, perform the processing of step S404 described below.

In step S404, the control device 1C determines a timing at which the temperature threshold T1 is changed, based on the map information and the path information acquired in step S401, and the vehicle speed detected in step S402. For example, the control device 1C sets a timing (time) of the change so as to change the temperature threshold T1 a few seconds before the traveling state of the vehicle V changes (that is, so as to allow the opening/closing operation of the shutter 2 to be completed before the traveling state of the vehicle V changes.

Note that a timing (position) of the change may be set so as to change the temperature threshold T1 a few hundred meters before a point at which the traveling state of the vehicle V changes.

In step S405, the control device 1C determines whether or not the timing determined in step S404 is reached. Where the timing determined in step S404 is not reached (S405:No), the control device 1C repeats the processing of step S405. On the other hand, where the timing determined in step S404 is reached (S405:Yes), the processing by the control device 1C proceeds to step S406.

In step S406, the control device 1C changes the temperature threshold T1. For example, when the vehicle V comes near a point at which a level road is changed to an uphill road (S403), the control device 1C makes the temperature threshold T1 lower than when traveling on the level road. This makes it possible to complete the opening operation of the shutter 2 associated with the change of the temperature threshold T1 before the vehicle V comes near to the uphill road. Therefore, a temperature rise in the engine room E can be suppressed to prevent malfunction of the machinery such as the engine.

Moreover, for example, when coming near a curve (S403), the control device 1C raises the temperature threshold T1 where the shutter 2 is closed. This allows a change in the grip force when traveling on the curve and a change in the grip force associated with the opening/closing of the shutter 2 to be hardly caused concurrently with respect to time, thus making it possible to suppress a change in behavior of the vehicle V.

Thus, for the processing in step S406, each processing in steps S102 to S105, and S109 to S111 (see FIG. 4) explained in the first embodiment, and/or each processing in steps S202 to S208 (see FIG. 7) explained in the second embodiment can be appropriately applied.

Steps S407 to S409 are the same as steps S106 to S108 (see FIG. 4) explained in the first embodiment and thus explanation thereof is omitted. After executing the processing of step S408 or S409, the processing by the control device 1C returns to "START" (RETURN).

⟨Advantageous Effects⟩

According to the present embodiment, the control device 1C changes the temperature threshold T1 prior to the timing at which the traveling state of the vehicle V is predicted to change (S403 to S406). This makes it possible, where the open/closed state of the shutter 2 needs to be changed, to complete the opening/closing operation of the shutter 2 before the traveling state changes, and to bring the shutter 2 into an appropriate open/closed state before the above change is caused. Consequently, a temperature rise in the engine room E and the engine (not shown) can be suppressed and a change in behavior of the vehicle V can be suppressed.

Fifth Embodiment

The fifth embodiment is different from the first embodiment in that the temperature threshold T1 is raised when a remaining travel distance predicted by a remaining travel distance predicting section 12k (see FIG. 12) is decreased to a predetermined threshold or less. Note that in a control device 1D (see FIG. 12), the configurations other than the remaining travel distance predicting section 12k are the same as those in the first embodiment. Therefore, description is given of parts different from the first embodiment, and description is omitted for duplicate parts.

Figure 12:
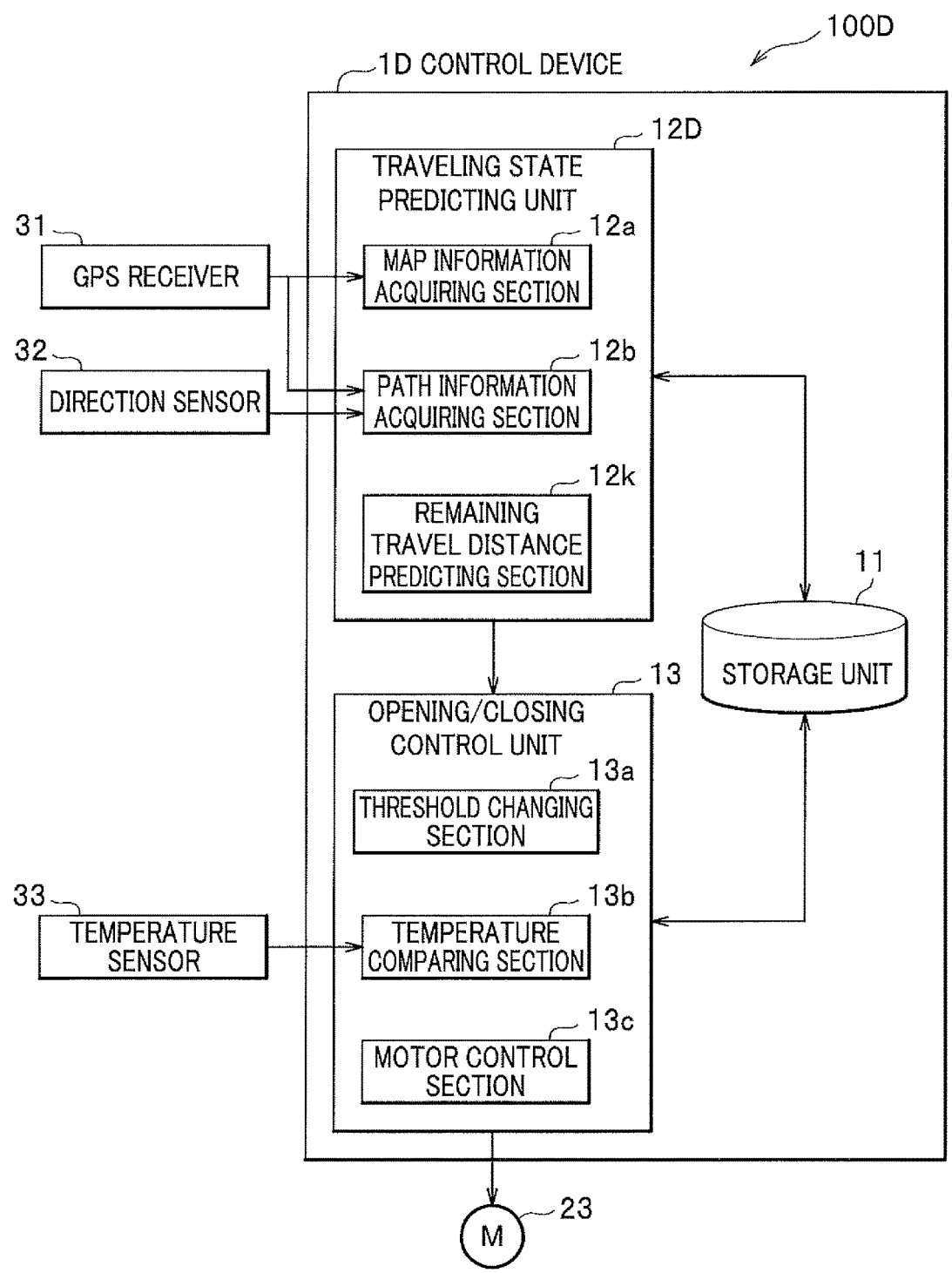
FIG. 12 is a functional block diagram related to a control system according to a fifth embodiment of the invention.

FIG. 12 is a functional block diagram related to a control system 100D according to the fifth embodiment. A traveling state predicting unit 12D of the control device 1D includes the map information acquiring section 12a, the path information acquiring section 12b, and the remaining travel distance predicting section 12k.

The remaining travel distance predicting section 12k has a function of predicting a remaining travel distance needed until the vehicle V stops, based on the path information acquired by the path information acquiring section 12b. The remaining travel distance predicted by the remaining travel distance predicting section 12k is used when determining whether to change the temperature threshold T1 or not. Moreover, the "path information" acquired by the path information acquiring section 12b includes the present position of the vehicle V, a destination (predicted stop point), and information indicating the path to the destination from the present position.

Figure 13:
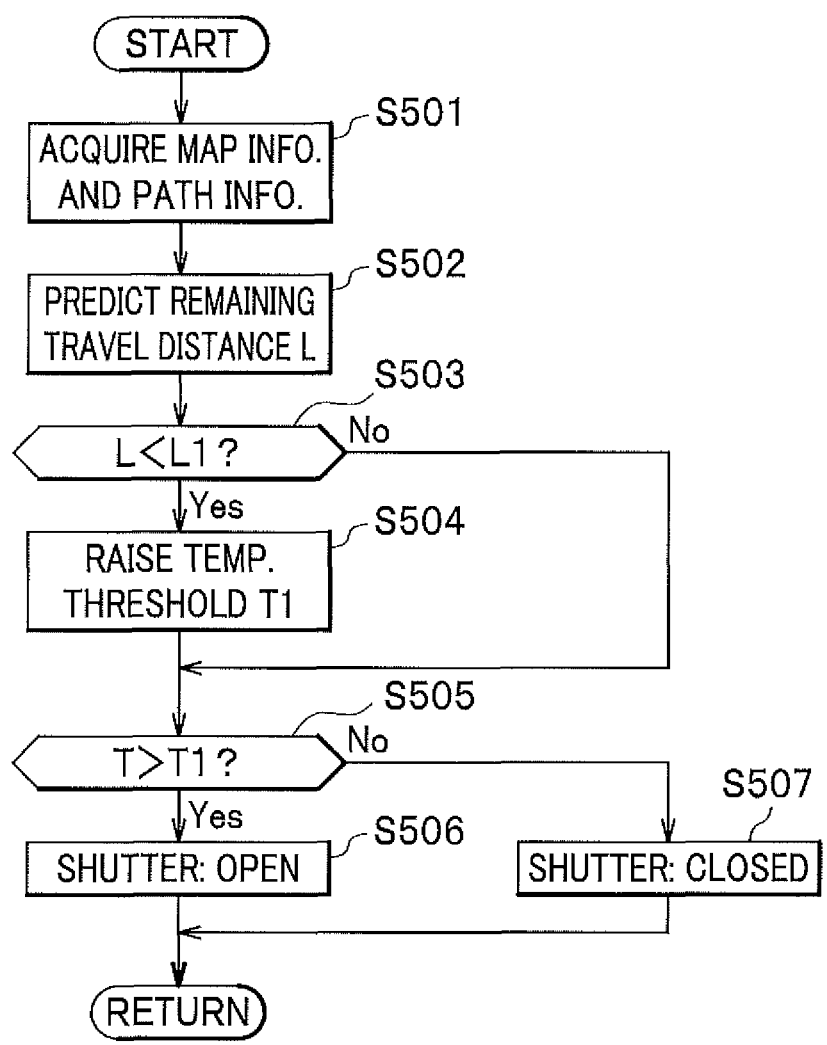
FIG. 13 is a flowchart showing processing executed by a control device.

FIG. 13 is a flowchart showing processing executed by the control device 1D.

In step S501, the control device 1D acquires map information and path information.

In step S502, the control device 1D predicts a remaining travel distance L needed until the vehicle V stops, by means of the remaining travel distance predicting section 12k.

In step S503, the control device 1D determines whether or not the remaining travel distance L predicted in step S502 is shorter than a predetermined distance L1. Note that the predetermined distance L1 is a distance that does not cause malfunction in the machinery such as the engine even if the vehicle continues to travel with the shutter 2 being closed, and the distance is set based on pre-experimentation.

Where the remaining travel distance L is shorter than the predetermined distance L1 (S503:Yes), the processing by the control device 1D proceeds to step S504. In step S504, the control device 1D raises the temperature threshold T1 and then proceeds to step S505. On the other hand, where the remaining travel distance L is equal to or longer than the predetermined distance L1 (S503:No), the processing by the control device 1D proceeds to step S505.

Steps S505 to S507 are the same as steps S106 to S108 (see FIG. 4) explained in the first embodiment and thus explanation thereof is omitted. After executing the processing of step S506 or S507, the processing by the control device 1D returns to "START" (RETURN).

Incidentally, in step S504, the temperature threshold T1 may be raised at the moment when the remaining travel distance L becomes shorter than the predetermined distance L1, and thereafter, the temperature threshold T1 may be kept constant.

Alternatively, after the remaining travel distance L is decreased to the predetermined distance L1 (S504), the temperature threshold T1 may be gradually raised every time the sequential processing shown in FIG. 13 is repeated (that is, as the vehicle comes nearer the destination). This makes it possible, for example, where a temperature in the engine room E suddenly rises to exceed the temperature threshold T1 when traveling on an uphill road near the destination, to quickly open the shutter 2 to cool the engine room E. Consequently, the engine room E can be moderately warmed while preventing malfunction of the engine and the like associated with the temperature rise.

⟨Advantageous Effects⟩

Figure 14:
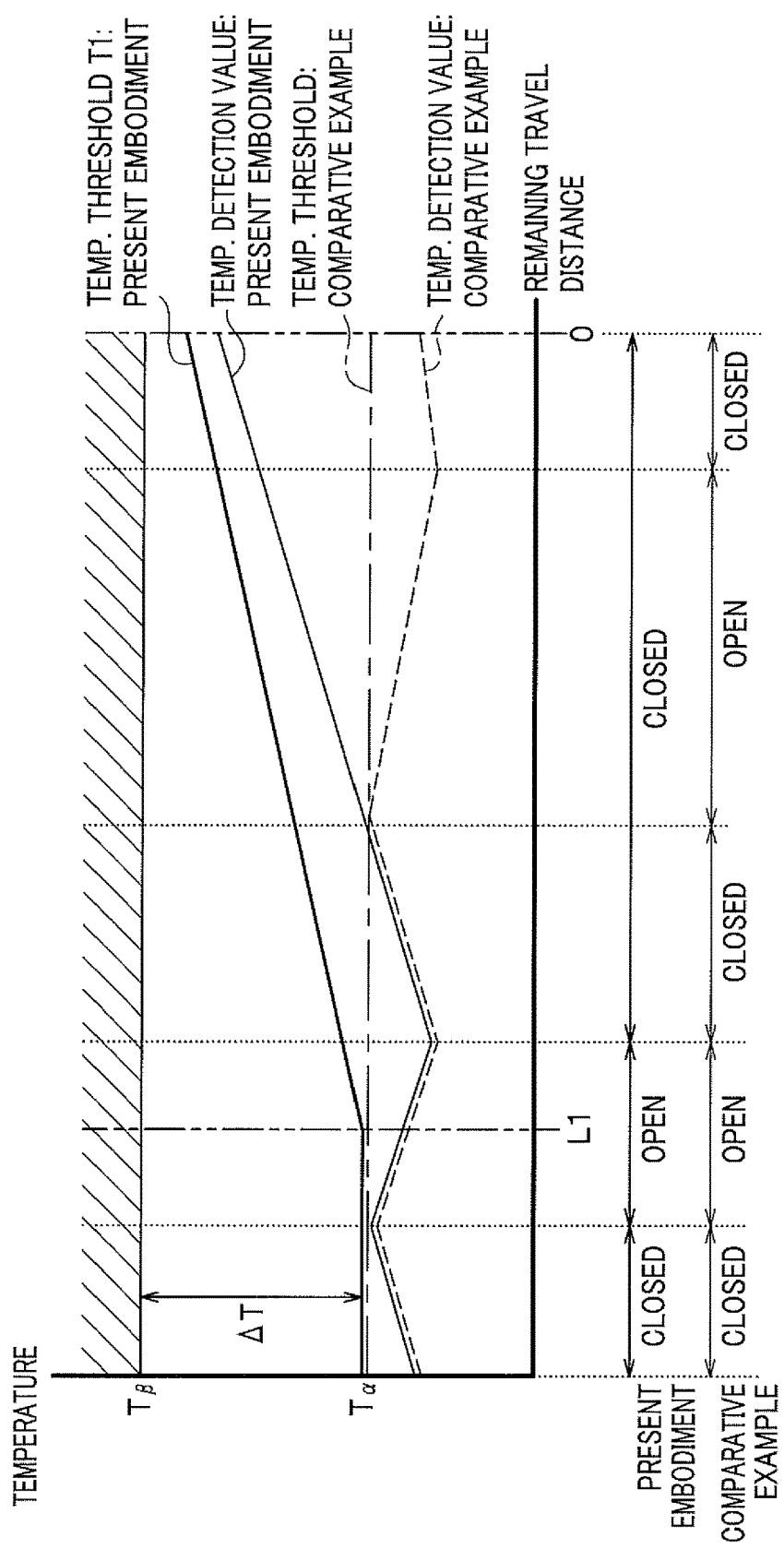
FIG. 14 is an explanatory diagram showing a remaining travel distance of the vehicle, a change in the temperature threshold, a change in the temperature detection value, and an open/closed state of the shutter.

FIG. 14 is an explanatory diagram showing the remaining travel distance L of the vehicle V, a change in the temperature threshold T1, a change in the temperature detection value, and the open/closed state of the shutter 2. Note that, with respect to the "present embodiment" shown in FIG. 14, the temperature threshold T1 that is changed so as to allow a value thereof to be gradually raised as the remaining travel distance L becomes shorter, and the temperature detection value in the engine room E, are indicated by solid lines. Moreover, with respect to a comparative example in which a temperature threshold $T_\alpha$ used in opening/closing of the shutter 2 is made constant, the temperature threshold $T_\alpha$ is indicated by a dashed line and the temperature detection value in the engine room E is indicated by a broken line.

Note that in the comparative example, a predetermined margin $\Delta T$ is given to a temperature threshold $T_\beta$ at which some malfunction may be caused in the engine and the like due to a temperature rise in the engine room E, thereby setting the temperature threshold $T_\alpha$. This is because the shutter 2 is adapted to be early opened in consideration of a case where a temperature in the engine room E is hard to fall even if the shutter 2 is opened, for example, when traveling on an uphill road in the environment having a high ambient temperature.

However, even if the temperature in the engine room E exceeds the temperature threshold $T_\alpha$ a few hundred meters to a few kilometers before a point at which the vehicle V stops, the engine (not shown) is stopped after the vehicle V stops, and thereafter, the temperature in the engine room E never rises (never rises up to the temperature threshold $T_\beta$). Therefore, the comparative example leaves room for further improvement in fuel consumption and traveling stability corresponding to the margin $\Delta T$.

While on the other hand, in the "present embodiment", the temperature threshold T1 used in opening/closing of the shutter 2 is allowed to be gradually raised to positively close the shutter 2 as the remaining travel distance L to the destination (predicted stop point) becomes shorter. In the example shown in FIG. 14, the shutter 2 is continuously closed in the vicinity of the predicted stop point as compared to the comparative example, thus making it possible to reduce a change in behavior of the vehicle V until the vehicle arrives at the destination. Moreover, the engine room E can be prevented from being wastefully cooled, thereby making it possible to reduce energy required for warming-up at the next start-up and thus to enhance fuel consumption of the vehicle V.

Sixth Embodiment

Figure 15:
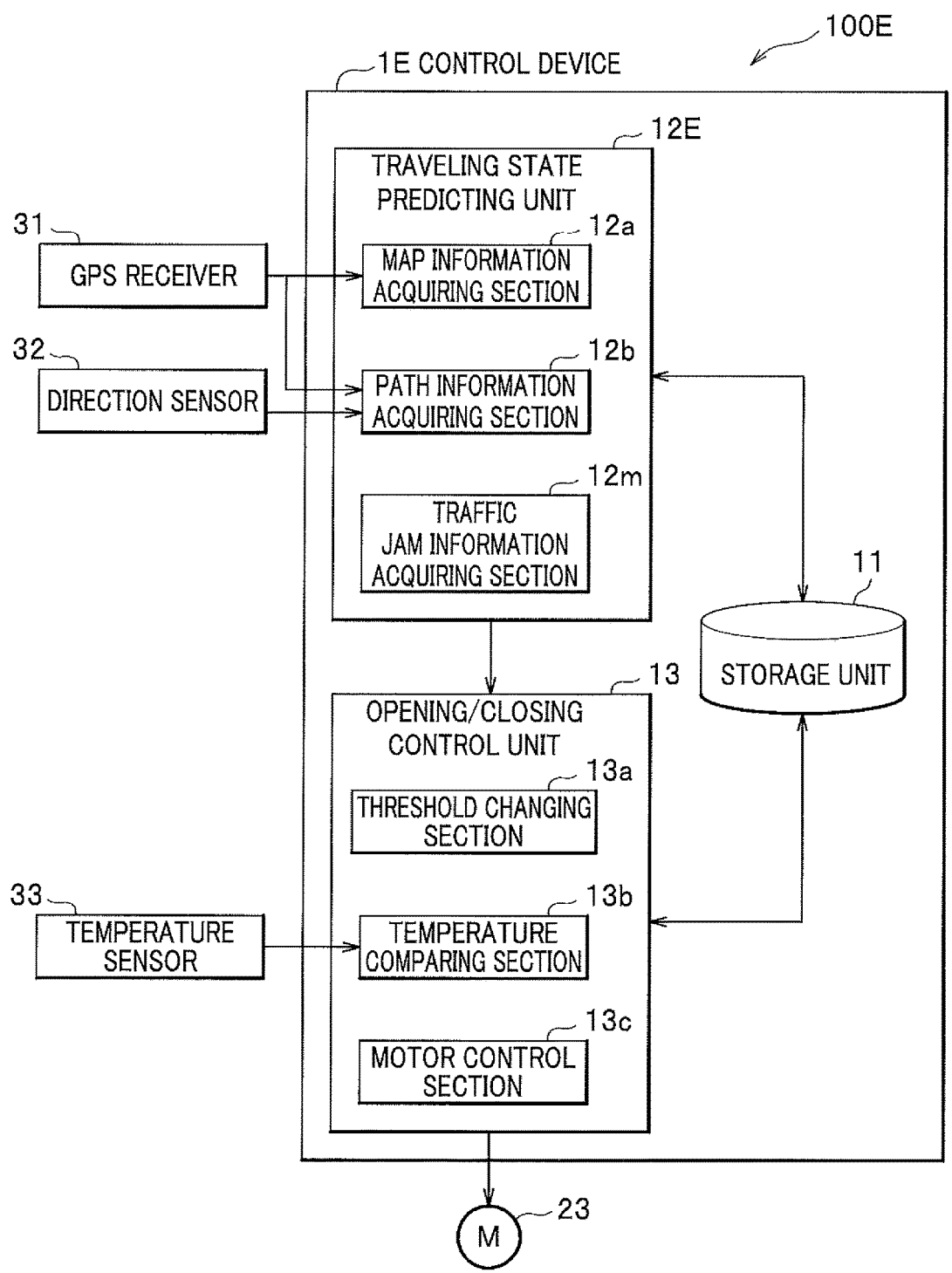
FIG. 15 is a functional block diagram related to a control system according to a sixth embodiment of the invention.

The sixth embodiment is different from the first embodiment in that the temperature threshold T1 is changed based on traffic jam information acquired by a traffic jam information acquiring section 12m (see FIG. 15). Note that in a control device 1E (see FIG. 15), the configurations other than the traffic jam information acquiring section 12m are the same as those explained in the first embodiment (see FIG. 3). Therefore, description is given of parts different from the first embodiment, and description is omitted for duplicate parts.

FIG. 15 is a functional block diagram related to a control system 100E according to the sixth embodiment. A traveling state predicting unit 12E of the control device 1E includes the map information acquiring section 12a, the path information acquiring section 12b, and the traffic jam information acquiring section 12m.

The traffic jam information acquiring section 12m has a function of acquiring traffic jam information related to paths on which the vehicle V travels, based on the path information acquired by the path information acquiring section 12b. Note that the traffic jam information is acquired from optical beacons (not shown) and radio beacons (not shown) which are set up on roads.

Figure 16:
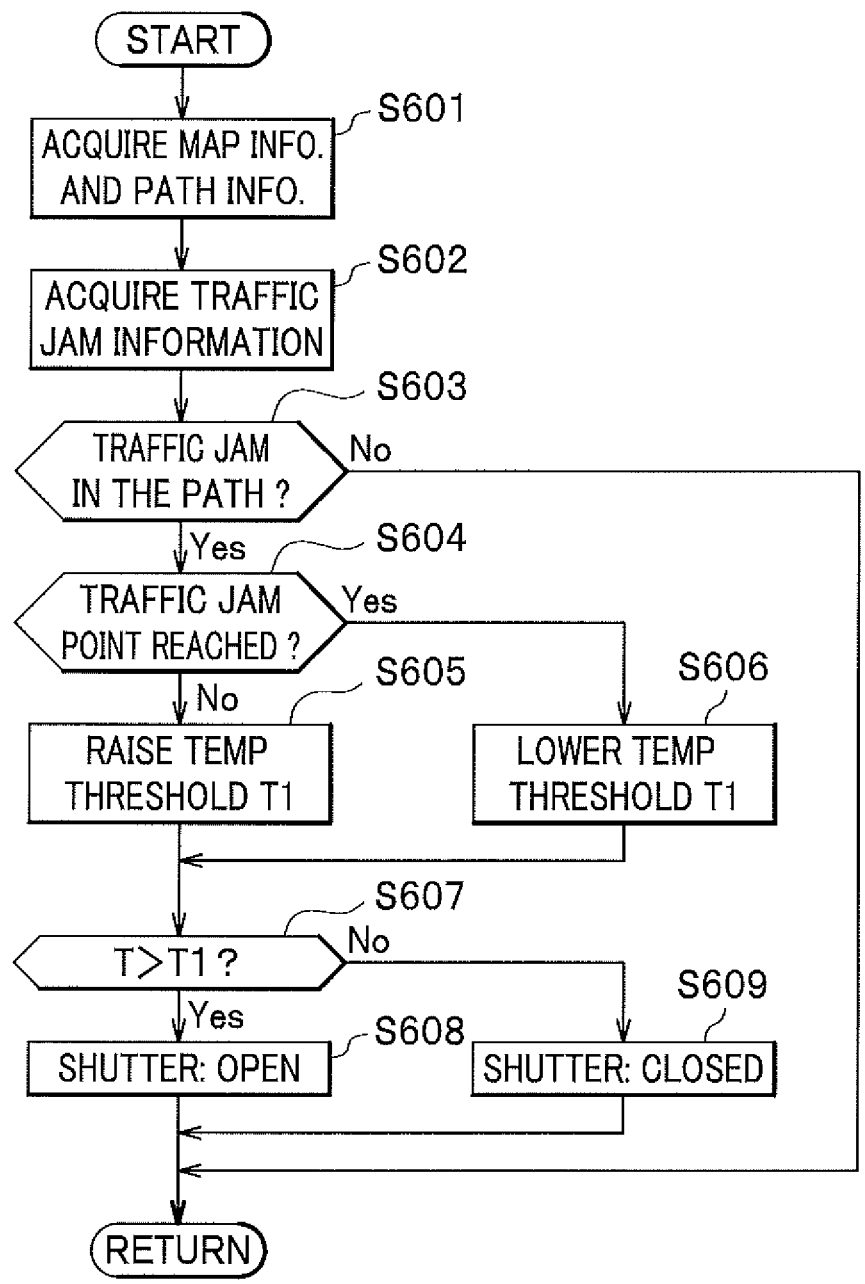
FIG. 16 is a flowchart showing processing executed by a control device.

FIG. 16 is a flowchart showing processing executed by the control device 1E.

In step S601, the control device 1E acquires map information and path information.

In step S602, the control device 1E acquires traffic jam information by means of the traffic jam information acquiring section 12m.

In step S603, the control device 1E determines, based on the traffic jam information acquired in step S602, whether or not there is a traffic jam in the path. More specifically, the control device 1E determines whether or not the vehicle V reaches a traffic jam point when the vehicle V continues to travel on the path indicated by the path information acquired in step S601. Where there is a traffic jam in the path (S603:Yes), the processing by the control device 1E proceeds to step S604. On the other hand, where there is no traffic jam in the path (S603:No), the processing by the control device 1E returns to "START" (RETURN).

In step S604, the control device 1E determines whether or not the vehicle V reaches the traffic jam point. Where the vehicle V does not reach the traffic jam point (S604:No), the processing by the control device 1E proceeds to step S605.

In step S605, the control device 1E makes the temperature threshold T1 higher than normal time to bring the shutter 2 into a state of being easily closed. The "normal time" described above corresponds to, for example, a case where the vehicle travels on a road where no traffic jam occurs and there are hardly curves or gradients.

Since aerodynamic is hardly caused in traffic jams, the shutter 2 is positively closed until the vehicle V arrives at the traffic jam point, thereby enhancing aerodynamic of the vehicle V and suppressing a change in behavior of the vehicle V. Note that a travel distance to the traffic jam point may be predicted and when the travel distance becomes shorter than a predetermined threshold (e.g. a few kilometers), the temperature threshold T1 may be raised.

In step S604, where the vehicle V reaches the traffic jam point (S604:Yes), the processing by the control device 1E proceeds to step S606.

In step S606, the control device 1E makes the temperature threshold T1 lower than normal time to bring the shutter 2 into a state of being easily opened. This makes it possible to suppress a temperature rise of the machinery in the engine room E.

After executing the processing of step S605 or S606, the processing by the control device 1E proceeds to step S607.

Note that steps S607 to S609 are the same as steps S106 to S108 (see FIG. 4) explained in the first embodiment and thus explanation thereof is omitted. After executing the processing of step S608 or S609, the processing by the control device 1E returns to "START" (RETURN).

⟨Advantageous Effects⟩

According to the present embodiment, the temperature threshold T1 is made higher than normal time until the vehicle V arrives at the traffic jam point (S604:No, S605), to positively close the shutter 2, thereby making it possible to enhance aerodynamic of the vehicle V and to suppress a change in behavior of the vehicle V. Moreover, the temperature threshold T1 is made lower than normal time in traffic jams (S604:Yes, S606), to positively open the shutter 2, thereby making it possible to suppress a temperature rise of the machinery in the engine room E.

Seventh Embodiment

Figure 17:
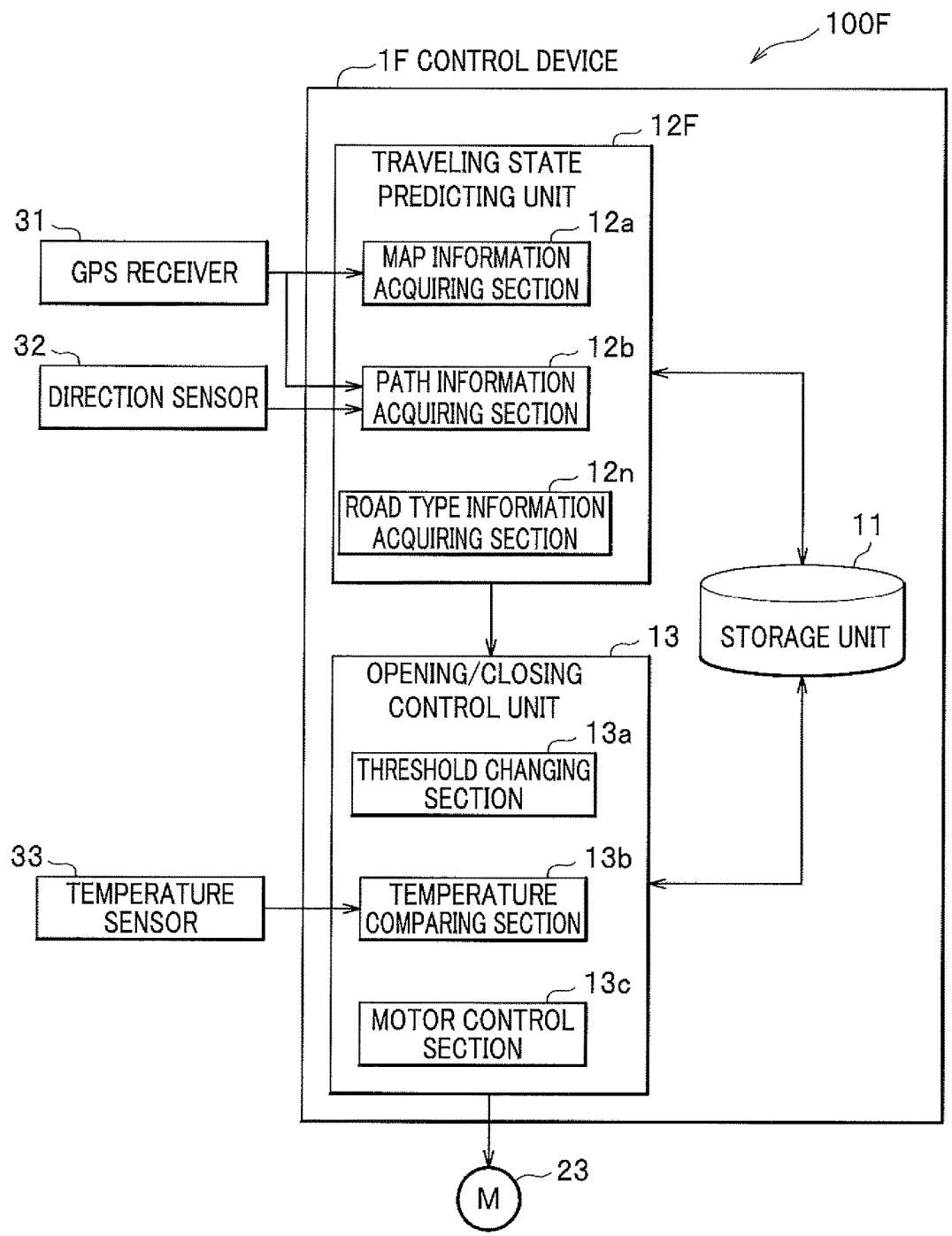
FIG. 17 is a functional block diagram related to a control system according to a seventh embodiment of the invention.

The seventh embodiment is different from the first embodiment in that the temperature threshold T1 is changed based on road type information acquired by a road type information acquiring section 12n (see FIG. 17). Note that in a control device 1F (see FIG. 17), the configurations other than the road type information acquiring section 12n are the same as those explained in the first embodiment. Therefore, description is given of parts different from the first embodiment, and description is omitted for duplicate parts.

FIG. 17 is a functional block diagram related to a control system 100F according to the seventh embodiment. A traveling state predicting unit 12F of the control device 1F includes the map information acquiring section 12a, the path information acquiring section 12b, and the road type information acquiring section 12n.

The road type information acquiring section 12n has a function of acquiring road type information related to road types of paths on which the vehicle V travels, based on the path information acquired by the path information acquiring section 12b. Note that the road type information includes information indicating which of a general road and an expressway the path on which the vehicle V is predicted to travel comes under. Moreover, the road type information is acquired from optical beacons (not shown) and radio beacons (not shown) which are set up on roads.

Figure 18:
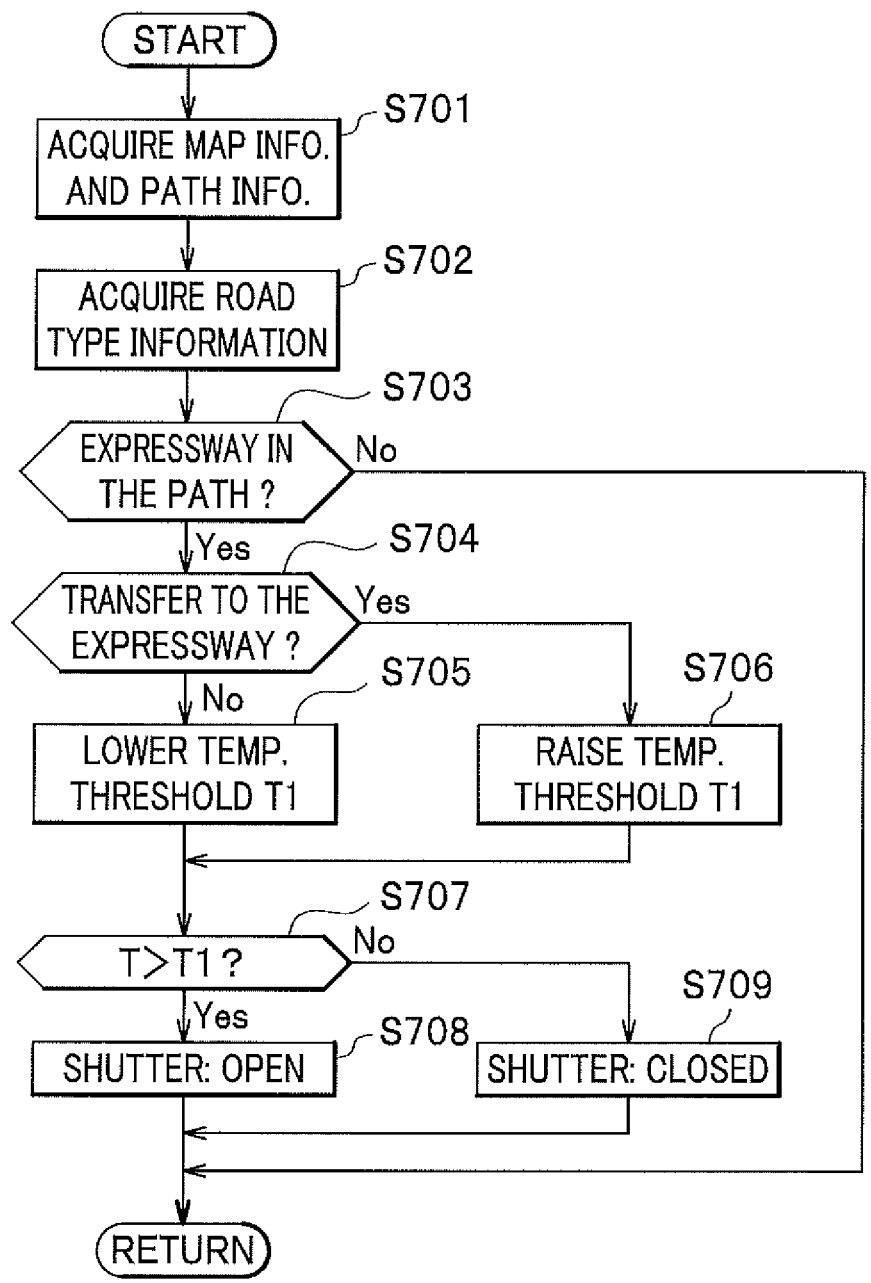
FIG. 18 is a flowchart showing processing executed by a control device.

FIG. 18 is a flowchart showing processing executed by the control device 1F.

In step S701, the control device 1F acquires map information and path information.

In step S702, the control device 1F acquires road type information by means of the road type information acquiring section 12n.

In step S703, the control device 1F determines, based on the road type information acquired in step S702, whether or not there is an expressway in the path. More specifically, the control device 1F determines whether or not the vehicle V transfers from a general road to an expressway when the vehicle V continues to travel on the path indicated by the path information acquired in step S701. Where there is an expressway in the path (S703:Yes), the processing by the control device 1F proceeds to step S704. On the other hand, where there is no expressway in the path (S703:No), the processing by the control device 1F returns to "START" (RETURN).

In step S704, the control device 1F determines whether or not the vehicle V transfers to the expressway. Where the vehicle V does not transfer to the expressway (S704:No), the processing by the control device 1F proceeds to step S705.

In step S705, the control device 1F makes the temperature threshold T1 lower than when traveling on the general road, to bring the shutter 2 into a state of being easily opened. Since it is predicted that the vehicle travels on the expressway thereafter (S703:Yes), the shutter 2 is opened until the vehicle transfers to the expressway, thereby preferentially perform cooling of the engine and the like. Note that a travel distance needed until the vehicle transfers to the expressway may be predicted and when the travel distance becomes shorter than a predetermined threshold (e.g. a few kilometers), the temperature threshold T1 may be lowered.

In step S704, where the vehicle V transfers to the expressway (S704:Yes), the processing by the control device 1F proceeds to step S706.

In step S706, the control device 1F makes the temperature threshold T1 higher than when traveling on the general road, to bring the shutter 2 into a state of being easily closed. This makes it possible to enhance aerodynamic of the vehicle V and to stabilize behavior of the vehicle V. Moreover, the shutter 2 is closed to decrease air resistance, thus making it possible to enhance fuel consumption of the vehicle V.

After executing the processing of step S705 or S706, the processing by the control device 1F proceeds to step S707. Note that steps S707 to S709 are the same as steps S106 to S108 (see FIG. 4) explained in the first embodiment and thus explanation thereof is omitted. After executing the processing of step S708 or S709, the processing by the control device 1F returns to "START" (RETURN).

Note that the present embodiment can also be applied to a case where there is a by-pass road in the path, which is used in bypassing a section getting seriously jammed or a section including a narrow road width. That is, in the case where there is a by-pass road in the path, the temperature threshold T1 may be made lower than when traveling on the general road until the vehicle transfers to the by-pass road, and the temperature threshold T1 may be made higher than when traveling on the general road when the vehicle transfers to the by-pass road.

⟨Advantageous Effects⟩

According to the present embodiment, the temperature threshold T1 is made lower than normal time until the vehicle V transfers to the expressway (S704:No, S705), to positively open the shutter 2, thereby making it possible to cool the machinery in the engine room E. Further, since the machinery is cooled just before transferring to the expressway, time during which the shutter 2 is closed (time during which air resistance is lower than a case where the shutter 2 is opened) can be secured long. Therefore, fuel consumption of the vehicle V can be enhanced as compared to the conventional art.

Moreover, the temperature threshold T1 is made higher than normal time when the vehicle V transfers to the expressway (S704:Yes, S706), to positively close the shutter 2, thereby making it possible to enhance aerodynamic of the vehicle V and to stabilize behavior of the vehicle V.

Modified Examples

The control device 1 and the like for the shutter 2 according to the present invention have been described above through each of the embodiments, but the present invention is not limited to these embodiments and can be variously modified.

For example, in the first embodiment, description has been given of the control in which, where the detection value T of the temperature sensor 33 (see FIG. 3) exceeds the temperature threshold T1 (S106:Yes), the control device 1 brings the shutter 2 into the open state (S107), and where the detection value T is equal to or lower than the temperature threshold T1 (S106:No), the control device 1 brings the shutter 2 into the closed state (S108), but the embodiment is not limited to the above control. That is, a control may be performed such that where the detection value T of the temperature sensor 33 exceeds the temperature threshold T1 (S106:Yes), the shutter 2 is driven to the opening direction to increase an opening ratio, and where the detection value T of the temperature sensor 33 is equal to or lower than the temperature threshold T1 (S106:No), the shutter 2 is driven to the closing direction to decrease the opening ratio.

The above "opening ratio" is a numerical value indicating the degree with which the shutter 2 is open or opened. When the shutter 2 is in a fully open state, the opening ratio is 100%, and when the shutter 2 is in a fully closed state, the opening ratio is 0%. Note that the "open state" described in the CLAIMS also includes a case where the opening ratio of the shutter 2 is relatively high (e.g. 70%). Moreover, the "closed state" described in the CLAIMS also includes a case where the opening ratio of the shutter 2 is relatively low (e.g. 30%).

As an example, in the case where it is predicted that the vehicle V travels on the up-grade (uphill traveling) after the lapse of the predetermined time Δt from the present time (S104:Yes), when the detection value T of the temperature sensor 33 exceeds the temperature threshold T1 (S106:Yes), the control device 1 drives the shutter 2 to the opening direction to set the opening ratio to 70%. In this case, when the vehicle V actually comes near to the up-grade, the control device 1 preferably drives the shutter 2 further to the opening direction to set the opening ratio to 100%. This makes it possible, even if prediction related to the traveling state deviates (for example, even when the vehicle actually travels on a level road, not on the up-grade), to suppress a change in behavior of the vehicle V because a subsequent change in the opening ratio of the shutter 2 becomes relatively small.

Note that the above modification can also be applied to the second to seventh embodiments.

Moreover, in the second embodiment, description has been given of the case where the traveling state predicting unit 12A (see FIG. 6) includes the opening/closing speed changing section 12e that changes the opening/closing speed of the shutter 2, the opening/closing speed changing section 12e may be omitted. Even in this case, the temperature threshold T1 used in opening/closing of the shutter 2 is changed depending on presence or absence of a change in grip force (S203, S205 to S207: see FIG. 7), thereby making it possible to suppress a change in behavior of the vehicle V.

Moreover, in the third embodiment, description has been given of the case where the traveling state predicting unit 12B (see FIG. 8) includes the time changing section 12g and the prediction period changing section 12h, but the embodiment is not limited to the above case. That is, one of the time changing section 12g and the prediction period changing section 12h may be omitted. Even in this case, the predetermined time Δt or the prediction period is appropriately changed depending on whether or not the traveling state of the vehicle V frequently changes (S302, S305: see FIG. 9), thereby making it possible to achieve suppression of a change in behavior of the vehicle V.

Furthermore, each of the embodiments can be appropriately combined together.

For example, the first embodiment and the second embodiment may be combined together, in which the temperature threshold T1 is lowered just before coming near to an up-grade (S104:Yes, S105); the temperature threshold T1 is raised just before coming near to a down-grade (S109:Yes, S110); and the temperature threshold T1 is changed so as to maintain the open/closed state at the present time of the shutter 2 just before coming near to a curve (S202 to S207). Note that, for example, when the shutter 2 is closed at the present time and the vehicle comes near to an up-grade curve, the control explained in the first embodiment is prioritized to lower the temperature threshold T1, thereby allowing the shutter 2 to be positively opened. This is because priority should be given to preventing the engine (not shown) from overheating, rather than stabilizing behavior of the vehicle V.

Furthermore, all of the first, second and fifth to seventh embodiments may be combined together. In this case, as described above, where conditions in each of the embodiments coincide on the same road, the highest priority is given to the first embodiment adapted to prevent overheating of the engine (not shown); secondly, priority is given to the second embodiment adapted to achieve stabilization of behavior of the vehicle V; and lower priority is given to the fifth to seventh embodiments adapted to enhance fuel consumption.

Note that, as for the third embodiment adapted to change the predetermined time Δt and the prediction period, and the fourth embodiment adapted to change the temperature threshold T1 before the timing at which the traveling state of the vehicle V changes, the predetermined time Δt and the like are appropriately changed based on presence or absence of a gradient of the road, a curve, a tunnel and the like, as described in each of the embodiments.

Moreover, in each of the embodiments, description has been given of the case where the "driving source" of the vehicle V is the engine (not shown), but each embodiment is not limited to the above case. That is, each of the embodiments can also be applied to other kind of moving objects such as an electric vehicle whose "driving source" is a motor, a hybrid vehicle whose "driving source" is an engine and a motor, and a fuel cell vehicle whose "driving source" is a fuel cell.

REFERENCE SIGNS LIST 100, 100A, 100B, 100C, 100D, 100E, 100F: Control system
1, 1A, 1B, 1C, 1D, 1E, 1F: Control device
11: Storage unit
12, 12A, 12B, 12C, 12D, 12E, 12F: Traveling state predicting unit
12a: Map information acquiring section
12b: Path information acquiring section
12c: Gradient information acquiring section
12d: Grip force change predicting section
12e: Opening/closing speed changing section
12f: Traveling state determining section
12g: Time changing section
12h: Prediction period changing section
12i: Vehicle speed detecting section
12j: Traveling state change predicting section
12k: Remaining travel distance predicting section
12m: Traffic jam information acquiring section
12n: Road type information acquiring section
13: Opening/closing control unit
13a: Threshold changing section
13b: Temperature comparing section
13c: Motor control section
2: Shutter
23: Motor
33: Temperature sensor (Temperature detecting unit)
E: Driving source housing chamber
H: Opening section
V: Vehicle

The invention claimed is:

1. A system for controlling opening/closing of a shutter for a vehicle, the shutter being disposed at an opening section through which outside air is introduced into a driving source housing chamber that houses a driving source of the vehicle, the system comprising:
a temperature sensor that detects a temperature in the driving source housing chamber or a temperature of the driving source; and
a control device configured to provide:
an opening/closing control unit that brings the shutter into an open state when the temperature detected by the temperature detecting unit exceeds a predetermined threshold, and brings the shutter into a closed state when the temperature is equal to or lower than the threshold; and
a traveling state predicting unit that includes a map information acquiring section that acquires map information related to a map around the vehicle, and a path information acquiring section that acquires path information related to paths on which the vehicle travels, and predicts a traveling state of the vehicle after a lapse of a predetermined time based on the map information acquired by the map information acquiring section and the path information acquired by the path information acquiring section,
the opening/closing control unit including a threshold changing section that changes the threshold based on the traveling state of the vehicle after the lapse of the predetermined time predicted by the traveling state predicting unit,
wherein the traveling state predicting unit includes a prediction period changing section that changes a prediction period with which the traveling state of the vehicle is predicted, based on the map information and the path information, and
wherein the prediction period changing section sets the prediction period to be shorter than normal time when a prediction that the traveling state of the vehicle frequently changes is made, and sets the prediction period to be longer than the normal time when a prediction that the traveling state of the vehicle is monotonous is made.

2. The system for controlling opening/closing of the shutter for the vehicle, according to claim 1, wherein
the traveling state predicting unit includes a time changing section that changes the predetermined time based on the map information acquired by the map information acquiring section and the path information acquired by the path information acquiring section.

3. The system for controlling opening/closing of the shutter for the vehicle, according to claim 1, wherein
the traveling state predicting unit includes:
a vehicle speed detecting section that detects a vehicle speed which is a speed of the vehicle; and
a traveling state change predicting section that predicts a timing at which the traveling state of the vehicle changes, based on the vehicle speed detected by the vehicle speed detecting section, the map information acquired by the map information acquiring section and the path information acquired by the path information acquiring section, and the threshold changing section changes the threshold prior to the timing predicted by the traveling state change predicting section.

4. The system for controlling opening/closing of the shutter for the vehicle, according to claim 1, wherein
the traveling state predicting unit includes a gradient information acquiring section that acquires gradient information related to gradients of paths on which the vehicle travels, based on the path information acquired by the path information acquiring section, and
the threshold changing section lowers the threshold when it is predicted that the vehicle travels on an up-grade after the lapse of the predetermined time, based on the gradient information acquired by the gradient information acquiring section.

5. The system for controlling opening/closing of the shutter for the vehicle, according to claim 1, wherein
the traveling state predicting unit includes a gradient information acquiring section that acquires gradient information related to gradients of paths on which the vehicle travels, based on the path information acquired by the path information acquiring section, and
the threshold changing section raises the threshold when it is predicted that the vehicle travels on a down-grade after the lapse of the predetermined time, based on the gradient information acquired by the gradient information acquiring section.

6. The system for controlling opening/closing of the shutter for the vehicle, according to claim 1, wherein
the traveling state predicting unit includes a grip force change predicting section that predicts presence or absence of a change in a grip force of the vehicle after the lapse of the predetermined time from a present point in time as a reference, based on the path information acquired by the path information acquiring section, and
when the grip force change predicting section predicts that there is a change in the grip force of the vehicle, and the shutter is in the closed state at the present time, the threshold changing section raises the threshold, and
when the grip force change predicting section predicts that there is a change in the grip force of the vehicle, and the shutter is in the open state at the present time, the threshold changing section lowers the threshold.

7. The system for controlling opening/closing of the shutter for the vehicle, according to claim 1, wherein
the traveling state predicting unit includes a grip force change predicting section that predicts presence or absence of a change in a grip force of the vehicle after the lapse of the predetermined time from a present point in time as a reference, based on the path information acquired by the path information acquiring section, and the opening/closing control unit includes an opening/closing speed changing section that changes an opening/closing speed of the shutter, wherein
when the grip force change predicting section predicts that there is a change in the grip force of the vehicle, the opening/closing speed changing section makes the opening/closing speed of the shutter slower than when it is predicted that there is no change in the grip force of the vehicle.

8. The system for controlling opening/closing of the shutter for the vehicle, according to claim 1, wherein
the traveling state predicting unit includes a remaining travel distance predicting section that predicts a remaining travel distance needed until the vehicle stops, based on the path information acquired by the path information acquiring section, and
the threshold changing section raises the threshold when the remaining travel distance predicted by the remaining travel distance predicting section is shorter than a predetermined distance.

9. The system for controlling opening/closing of the shutter for the vehicle, according to claim 1, wherein
the traveling state predicting unit includes a remaining travel distance predicting section that predicts a remaining travel distance needed until the vehicle stops, based on the path information acquired by the path information acquiring section, and
the threshold changing section gradually raises the threshold as the remaining travel distance predicted by the remaining travel distance predicting section becomes shorter.

10. The system for controlling opening/closing of the shutter for the vehicle, according to claim 1, wherein
the traveling state predicting unit includes a traffic jam information acquiring section that acquires traffic jam information related to paths on which the vehicle travels, based on the path information acquired by the path information acquiring section, and
the threshold changing section raises the threshold when it is predicted that the vehicle arrives at a traffic jam point, based on the traffic jam information acquired by the traffic jam information acquiring section.

11. The system for controlling opening/closing of the shutter for the vehicle, according to claim 1, wherein
the traveling state predicting unit includes a road type information acquiring section that acquires road type information related to road types of paths on which the vehicle travels, based on the path information acquired by the path information acquiring section, and
the threshold changing section lowers the threshold when it is predicted that the vehicle transfers from a general road to an expressway, based on the road type information acquired by the road type information acquiring section.

* * * * *